United States Patent

Potterveld et al.

[11] Patent Number: 5,878,431
[45] Date of Patent: Mar. 2, 1999

[54] METHOD AND APPARATUS FOR PROVIDING TOPOLOGY BASED ENTERPRISE MANAGEMENT SERVICES

[75] Inventors: Robert A. Potterveld, Fort Collins; Thomas G. Bartz, Loveland, both of Colo.; Andrew Zander, Queensland, Australia; Brian J. Atkins, Fort Collins, Colo.

[73] Assignee: Hewlett-Packard Company, Palo Alto, Calif.

[21] Appl. No.: 725,442

[22] Filed: Oct. 4, 1996

[51] Int. Cl.⁶ .................................................. G06F 17/30
[52] U.S. Cl. ................................ 707/103; 707/1; 707/3; 707/101
[58] Field of Search ..................... 707/103, 101, 707/3; 395/200.31, 200.5, 200.53, 200.63, 200.78, 183.14; 273/157 R

[56] References Cited

U.S. PATENT DOCUMENTS

| | | | |
|---|---|---|---|
| 5,307,484 | 4/1994 | Baker et al. | 395/600 |
| 5,369,778 | 11/1994 | Soucie | 707/103 |
| 5,418,942 | 5/1995 | Krawchuk | 707/3 |
| 5,448,727 | 9/1995 | Annevelink | 707/101 |
| 5,606,661 | 2/1997 | Wear | 395/183.14 |
| 5,684,984 | 11/1997 | Jones | 707/10 |
| 5,687,367 | 11/1997 | Dockter | 1/1 |
| 5,689,703 | 11/1997 | Atkinson | 273/157 R |

FOREIGN PATENT DOCUMENTS

A-0304071   2/1989   European Pat. Off. .

OTHER PUBLICATIONS

Johnson, Trisha, "HP Open View Meta–Schema Definition Working Draft," Hewlett–Packard Co. Jul. 11, 1994.

Klemba, K. & Kosarchyn, M., "A Model For Object Relationship Management," Hewlett–Packard Co., Date Unknown.

Object Management Group, Inc., "Joint Object Services Submission—Rlationship Service Specification," OMG TC Document 94.5.5, May 30, 1994.

Primary Examiner—Thomas G. Black
Assistant Examiner—Diane D. Mizrahi

[57] ABSTRACT

A method and system with associated data structures for providing management of topological associations between objects. The methods define an application programs interface (API) which specifies a consistent approach for the design of application programs to manage topological associations between objects. Objects each represent an aspect of a resource which is useful to a particular application program. Application programs define a resource aspect type for each object to be managed by the API. Objects are specified to the API by application programs along with resource names to identify a resource. The methods and structures of the present invention automatically recognize when the resource names of an object to be managed identify the same resource as other managed objects to thereby allow information to be more readily shared among disparate application programs and to reduce redundant storage of information by those programs.

21 Claims, 20 Drawing Sheets

METHOD AND APPARATUS FOR PROVIDING TOPOLOGY BASED ENTERPRISE MANAGEMENT SERVICES

BACKGROUND OF THE INVENTION

1. Field of the Invention

The present invention relates to the field of enterprise management systems and in particular to a computer based, object oriented, model of enterprise management which may be utilized to manage any objects which can be characterized by topological associations.

2. Description of the Related Art

Management systems utilized in a business or other enterprise frequently apply computing systems to automate aspects of the enterprise management. Enterprise management, as used herein, relates to the management of any objects used by the enterprise, and the topological associations between those objects. As used herein, "topological associations" refer to associations or relationships between objects. These associations or relationships are frequently represented graphically. A collection of objects and the topological associations between them is referred to herein as a "topology." A system which manages such topologies is referred to herein as a "topological" management system. Typical examples of such topological enterprise management computing systems are personnel management systems, asset management systems, network/computing management systems, communications management systems, and site management systems. It is common for large enterprises to use computing systems to aid in the management of these and other aspects of the enterprise.

For example, an enterprise may manage payroll functions through the management of objects such as payroll checks, employees, withholding accounts, retirement accounts, and the associations therebetween. An employee is associated with one withholding account and one retirement account but with several payroll checks. Or, in a further example, the management of an enterprise network may involve associations between several subnets, between a node and its neighbors, between a node and its users, or between a particular program and its users.

In general, prior management information application programs which attempt to manage topological aspects of an enterprise can be characterized as managing the objects in isolation and the associations between the managed objects. The rules that govern the associations between objects essentially define the topology. For example, the rules that define the associations between nodes and protocol layers in a Transmission Control Protocol/Internet Protocol (TCP/IP) network define a TCP/IP topology. Enterprise management applications which relate to TCP/IP network management therefore seek to enforce compliance with rules which define the TCP/IP topology. In all known prior management applications, there is no enterprise-wide standard for defining such topologies. Instead, a variety of disparate solutions tend to evolve, each of which manages a particular topology within the enterprise.

The types of objects managed and the managed associations between those objects varies widely among these enterprise topology management systems. It is common practice in the art to utilize different computer based management tools for each of the several management tasks common within an enterprise. A tool which is well tuned for a particular use, a particular aspect of enterprise management, is often preferred to a general purpose tool which attempts to incorporate more features in a generalized manner. Due to this preference it is common to use a plurality of management tools, often produced by disparate vendors, each well tuned to a different management task. By way of example, a personnel management task may select one computing system well tuned to payroll generation. A different tool may be preferred for maintaining other personnel records and enterprise organizational matters relating to staffing (i.e. organization charts).

A first problem with the use of disparate applications programs is the increase in development effort to create the needed applications. Frequently the various management applications are developed over a span of time by diverse development groups. Each application tends to develop its own unique structures and methods for managing the topological associations between the managed objects. This redundant development may increase the complexity and related costs for development of such topological management applications. In addition, the variety of independently developed structures and methods for managing topological associations between managed objects tends to lead toward incompatible designs which may be difficult to integrate.

A second problem with the use of disparate systems for different management tasks utilizing common elements of information arises in the inevitable duplication of stored information. Since each of the disparate management tasks typically is associated with its own unique format and structure for storage of information, it is common that similar information is duplicated in the information storage of several management applications. For example, one management application may require information regarding an employee with respect to payroll issues, while another application may store information regarding the same employee useful to business travel planning. Both management applications may need access to common information such as office mail stop and phone extension, etc. Both disparate management applications may store this common information for use in different operations (i.e. payroll deposits or travel scheduling).

This duplication of stored information increases the aggregate storage capacity needs of the enterprise. More importantly, when such common information is modified, (i.e. the employee moves to a new office mail stop), the information may be updated in one application but not another. Such potential inconsistencies in information managed by enterprise management applications creates problems for information manager. Each disparate management application must take responsibility for updating its own stored version of all common elements of information.

An enterprise could attempt to initially integrate all possible enterprise information management subsystems early in their design phases to avoid such information duplication problems. Such planning could produce a totally integrated, enterprise wide, information storage base which can avoid unnecessary duplication of stored data. Clearly, regardless of the degree of planning applied to the initial design of an integrated management information storage base, the need for new management information applications will arise. Such new applications will require significant re-design of the initially integrated information base. This requires significant efforts to re-design the information storage base. The re-design effort frequently requires the resources of a centralized management information technology group coordinating the required changes to maintain the desired information integration. Such centralized integration control based and human re-design intervention is inconsistent with the evolving de-centralization of data processing resources within an enterprise.

From the above discussion it can be seen that there exists a need for improved topological information management systems which automate the maintenance of topological associations between objects. Such improved systems would assist in reducing duplication of information stored within the topological management system in such a way that new management information applications could be more easily integrated with existing applications than is possible under known prior approaches.

SUMMARY OF THE INVENTION

The present invention solves the above identified problems and thereby advances the art by providing methods and related structures to manage topological associations between objects used in information management data processing applications. The methods and structures of the present invention permit an application designer to create management information application programs to manage disparate aspects of topological information.

The present invention provides an application program interface (hereinafter referred to as API) which is utilized by application programmers to create topological information management applications. The API of the present invention permits the creation, deletion, and modification of associations between objects supplied by the application program. These associations represent the topological association between the associated objects supplied by the application program. Objects known to the API by virtue of the creation of an association become "managed objects."

Topological rules, defined by the application programs, govern the creation, deletion, and modification of these topological associations between objects. These topological rules are stored and enforced by the API to govern the manipulation by application programs of associations between managed objects. The API of the present invention thereby enforces consistent rules for the manipulation of topologies managed by the API on behalf of several application programs.

Since the API provides a common structure and method for the management of topologies, duplication of information common to several application programs can be reduced. The API of the present invention provides a simple interface for an application developer to determine what information is presently managed by the API with respect to particular associations between managed objects. An application developer defines a particular set of attributes, useful to his/her management application, which uniquely defines the objects manipulated by the application. The API of the present invention detects that an object so defined by one application in fact refers to the same entity (also referred to herein as resource) as another object provided to the API topology management by the same or another application program. An application program thereby has a unique view of an entity represented by the object used by the application. The view of an object utilized by one application program is referred to herein as a resource aspect. The topology management API of the present invention can provide an application program any topological information from other managed objects which are recognized to represent the same entity (resource) as the managed object provided by the application program.

The API of the present invention also provides the ability to perform general topological queries of the entire enterprise-wide information base. General topological queries are queries that can provide information regarding managed objects and their managed topological associations. They can be generated as simple textual expressions yet may specify queries ranging from simple to very complex. These queries can involve objects and associations beyond the scope of information manipulated by any single application program. The query related API functions return subgraph object structures that contain the managed objects and their managed topological associations that matched the query.

Numerous other features, objects and advantages of the present invention will become apparent from the following description when read in conjunction with the accompanying drawings.

DETAILED DESCRIPTION OF THE PREFERRED EMBODIMENT

The present invention comprises an application program interface (API) which manages topologically associated objects according to rules which define one or more topologies. As used herein, "topological associations" refer to associations between objects which may be represented graphically. A collection of objects and the topological associations between them is referred to herein as a "topology." A system which manages such topologies is referred to herein as a "topological" management system. Topological management as used herein is also referred to as relationship management. In relationship management terminology, a topology is a set of managed relationships between managed objects, and topological information is a set of relationships between managed objects. Topological enterprise database refers equally to a relationship management database which contains topological information.

Figure 12:
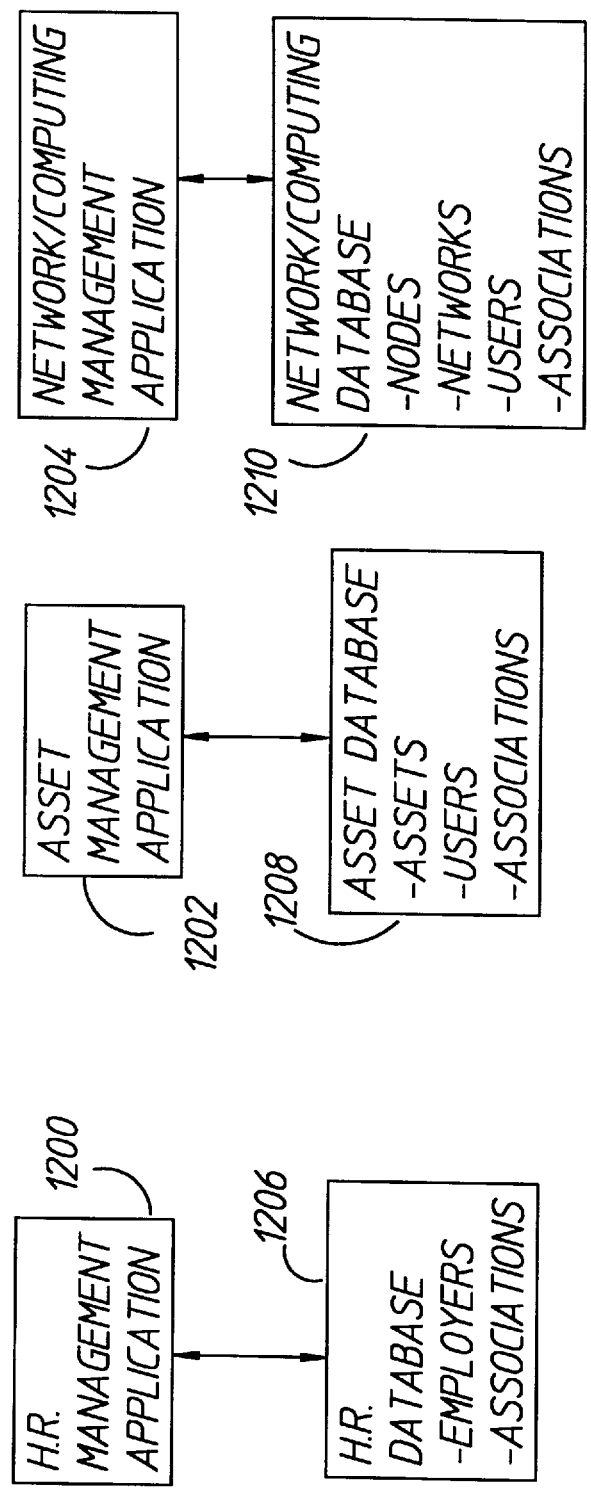
FIG. 12 shows a typical approach of the prior art wherein disparate application programs each manage particular enterprise topological information.

FIG. 12 provides an overview of typical methods applied by prior designs for enterprise management. Each distinct enterprise management task is designed with a customized application program. Each application program typically had its own database providing information and associated structure as appropriate to the specific application. In particular, typical applications which are used to manage topological information include human resources (H.R.) management applications 1200, asset management applications 1202, and network/computing management applications 1204. Each application has its own distinct application database associated therewith, namely, H.R. database 1206, asset database 1208, and network/computing database 1210, respectively.

Some information is common to all three management applications. For example, employee data in H.R. database 1206 shares some common information with the users data in asset database 1208 and with the users data in network/computing database 1210. Duplication of data in three databases creates problems in these prior designs. Problems, as discussed above, relate to one database being updated independently of another, unnecessary duplication of storage space, and difficulties in integrating one application with another as needs grow and evolve.

Figure 13:
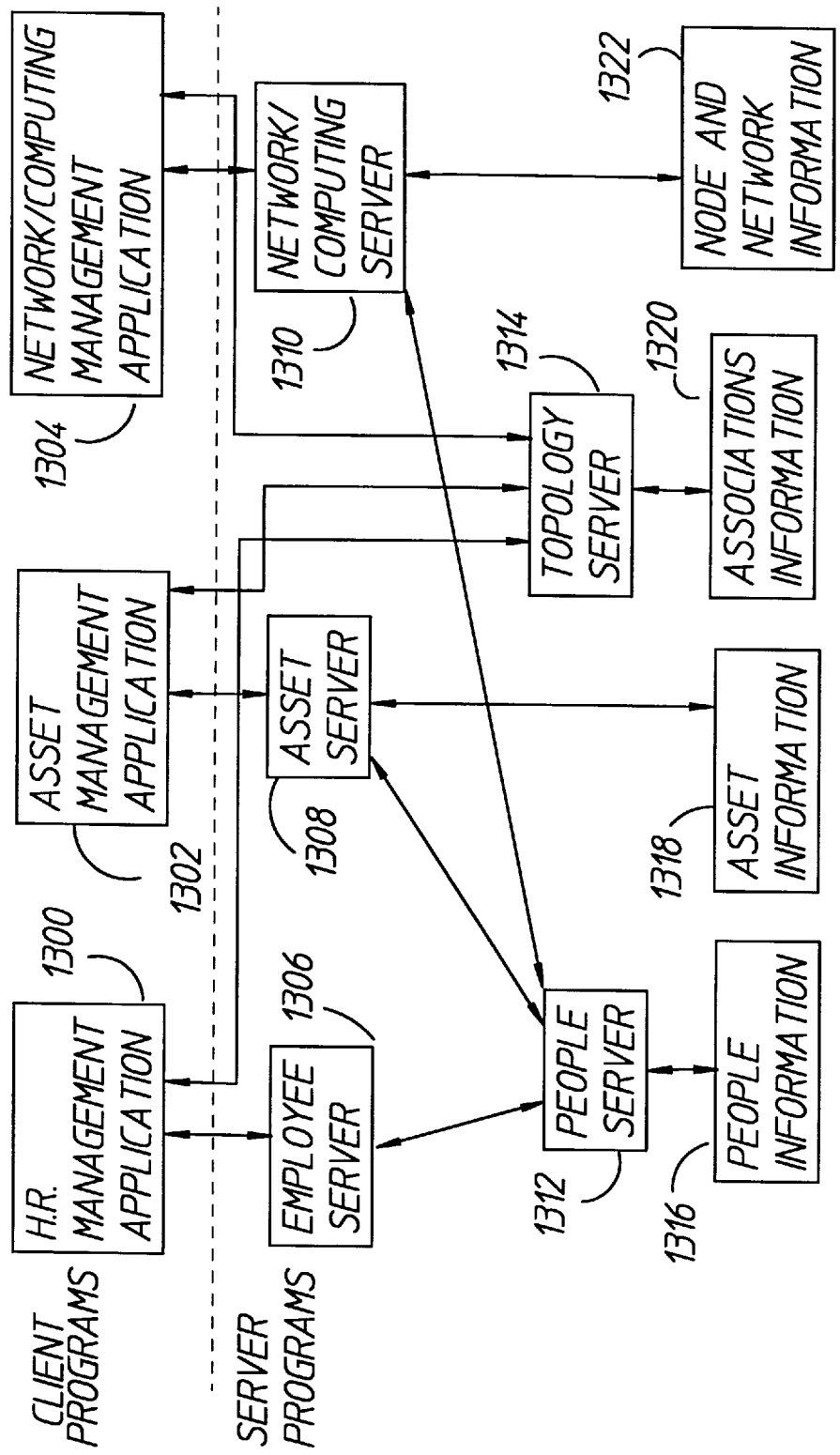
FIG. 13 shows various application programs utilizing the topological management service API of the present invention to manage all enterprise topologies using a common structure and related methods.

FIG. 13 depicts an overview of the enterprise management application designs made possible by the topology management service of the present invention. As in FIG. 12, FIG. 13 shows three separate management applications, namely H.R. management application 1300, asset management application 1302, and network/computing management application 1304. The three application programs 1300,1302, and 1304 are depicted above the dashed line in FIG. 13 to indicate that they are client application programs. However, unlike prior designs, all three applications utilize the common topology server 1314 of the present invention. Topology management server 1314 manages topological information (association information 1320) relating to the topological aspects of the objects manipulated by the three client application programs 1300, 1302, and 1304. All such topological information (association information 1320) is therefore managed according to a common set of rules through a common server program interface (topology server 1314). This permits each application client program to share topological information made known through other application client programs.

Other non-topological information may be managed by the application client programs through the use of dedicated server programs such as employee server 1306, asset server 1308, and network/computing server 1310. As depicted in FIG. 13, the server programs may in turn invoke the services of other common server programs such as people server 1312 to share common elements of information more effectively. People server program 1312 manages non-topological information relating to people in people information 1316. Asset server program 1308 manages asset information 1318 which is unique to its particular management task. Similarly, network/computing server program 1310 manages network/computing information 1322 which is unique to its application area.

Figure 1:
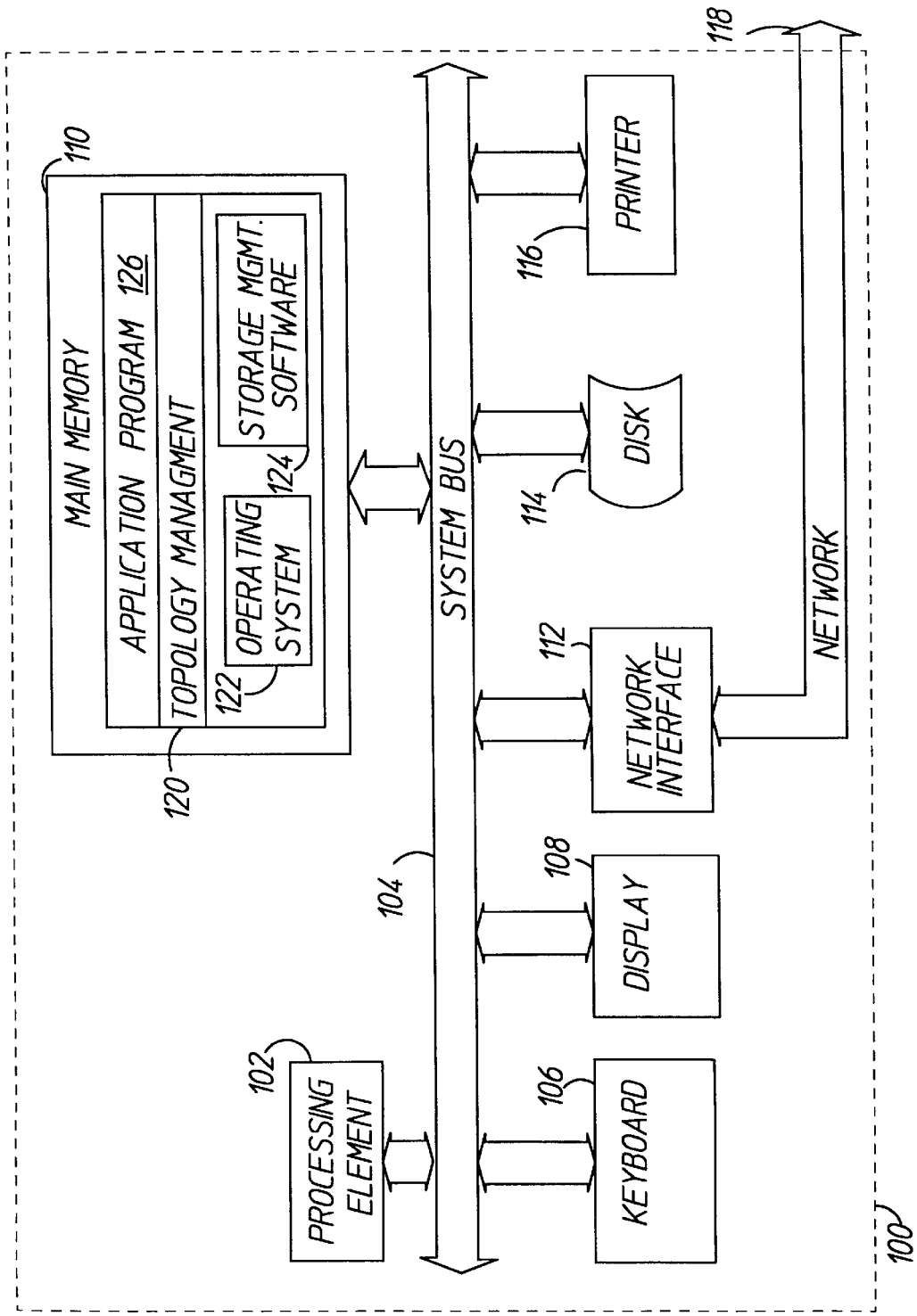
FIG. 1 shows a general purpose data processing system which may embody the API structures and methods of the present invention.

FIG. 1 shows a block diagram of the computer hardware that contains the topology management services system of the present invention. In FIG. 1, a computer system 100 contains a processing element 102 which communicates to other elements within the computer system 100 over a system bus 104. A keyboard 106 is used to input information from a user of the system, and a display 108 is used to output information to the user. A network interface 112 is used to interface the system 100 to a network 118 to allow the computer system 100 to act as a node on a network and to thereby communicate with other nodes on the network. A disk 114 is used to store the software of the topology management system of the present invention, to store the topological enterprise database, and to store the managed objects. A printer 116 can be used to provide a hard copy output of the topology information displayed by the system.

A main memory 110 within the system 100 contains the topology management system 120 of the present invention. An application program 126, developed by a user of the present invention communicates with the topological management system 120, which in turn communicates with an operating system 122 and storage management software 124 to perform the topological management services on behalf of client application programs. The client application programs 126 may operate locally, within computer system 100 or may operate on other computer systems attached to, and communicating over, network 118. It will also be recognized by those of ordinary skill in the art that the information stored in the topological enterprise database may be stored locally on disk 114, or may be stored locally in main memory 110, or may be distributed over other computer systems accessible via network 118, or in any combination of storage devices. For example, permanent storage of the information may reside on local or remote disk subsystems and a local memory cache may be used to improve performance. More generally, the information stored in the topological enterprise database may be stored in any memory device or subsystem having suitable capacity and performance characteristics. The term disk 114 as used herein is intended to describe all such suitable memory devices or subsystems.

Figure 2:
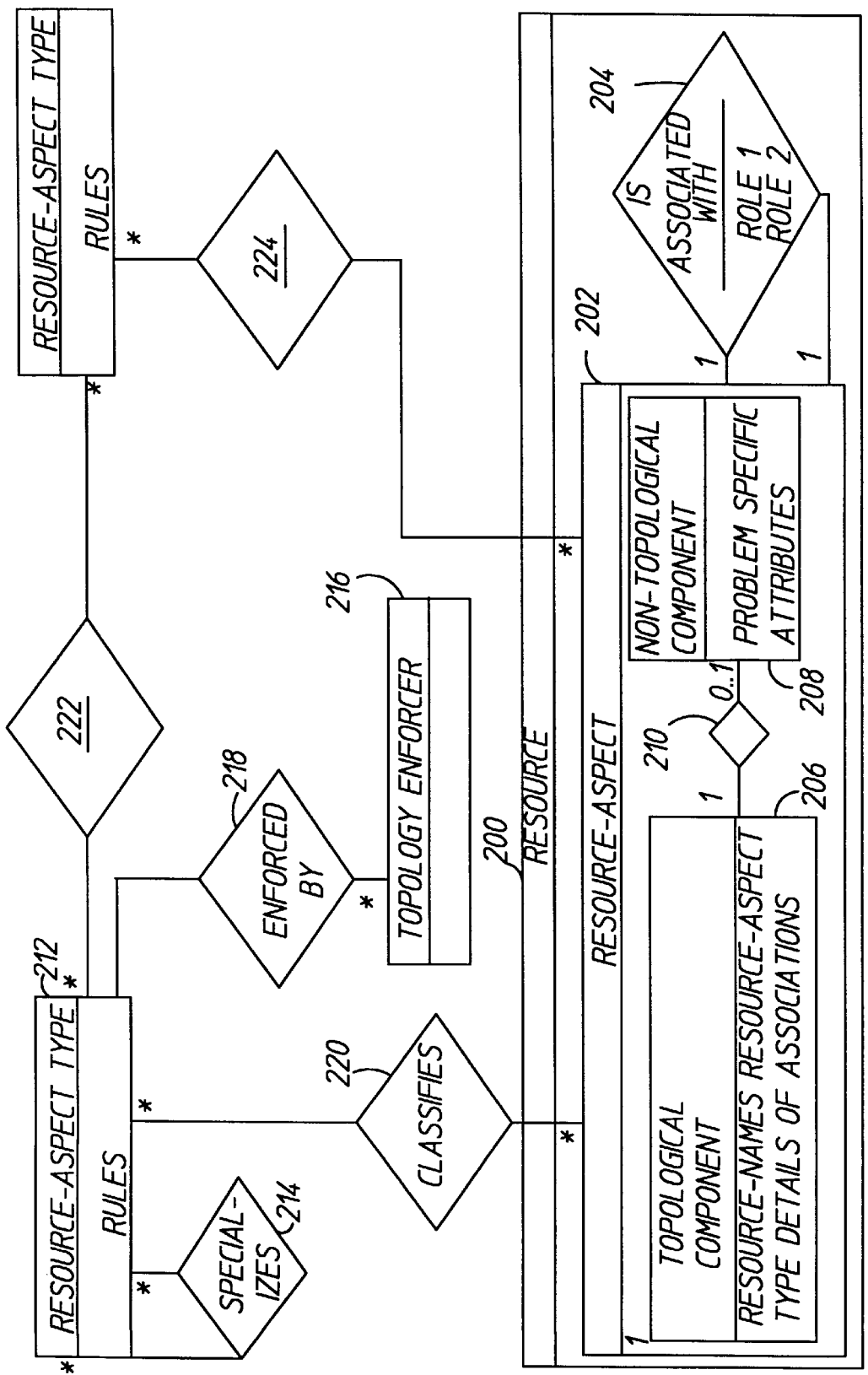
FIG. 2 depicts an object oriented analysis and design view of the API structures manipulated by the methods of the present invention.

FIG. 2 is an overview of the data constructs and relationships created and managed by the topological management methods of the present invention. FIG. 2 is an object oriented analysis view of the data constructs and relationships of the present invention. It is drawn and to be interpreted according to the FUSION object model. FUSION is an object oriented analysis and design tool produced by Hewlett Packard Company of Palo Alto, Calif. Readers unfamiliar with such object oriented design are directed to the published documentation for the Fusion Method in "Object-Oriented Development—the Fusion Method" (published by Prentice Hall ISBN 0-13-338823-9).

The data constructs are indicated by labelled boxes and the relationships between the data constructs are indicated by lines connecting the related boxes to a diamond shaped entity. The lines connecting data construct boxes in FIG. 2 are labelled to indicate the type of relationship between the related boxes. A label of "1" for example indicates that exactly one of the data constructs participates in the relationship, A label of "*" indicates zero or more data constructs participate in the associated relationship and a label of "+" indicates one of more data constructs. For example, a one-to-one relationship between two data constructs is indicated by a numeral "1" at each end of the lines connecting the data construct boxes to the diamond shaped relationship. A one-to-many relationship is indicated by a numeral "1" at the line connecting a first data construct box and a "*" or "+" character at the line connected to the other data construct box. A one-to-one relationship indicates that each data construct represented by the box at one end of the relationship is related to exactly one of the type of data constructs at the opposite end of the relationship. A one-to-many relationship indicates that each data construct represented by the box connected to the relationship with a line labelled "1" is related to zero or more of the data constructs at the other side of the relationship with a line labelled "*" (one or more if the line end is labelled "+").

DATA CONSTRUCTS
RESOURCES, RESOURCE ASPECTS, AND RESOURCE ASPECT TYPES:

Resource 200 is a data construct which represents the combined characteristics of all aspects of a "thing" of interest in the application of the methods of the present invention. A resource 200 is an instance of a thing, at the highest level of abstraction, to be managed by the present invention. For example, a person, a building, a network, or a computing node might be examples of abstract things to be managed by the topology management methods of the present invention. The level of abstraction useful to a particular application of the present invention is a matter of design choice and is frequently associated with the well known methods of Object Oriented Design and Analysis common to the software engineering arts.

A resource 200 is comprised of one or more resource aspects 202 (hereinafter referred to as RAs). An RA 202 is an object supplied by an application program using the topological management methods of the present invention. An RA 202 further comprises a topological component 206 which is related to zero or one non-topological components 208 as depicted in FIG. 2 by relation 210. The topological component 206 of an RA 202 contains the information relevant to the topological management service of the present invention, specifically resource names, the associated resource aspect type, and details relating to associations in which the RA 202 is participating. Details of these elements are discussed below. The non-topological component 208 of an RA 202 contains information unique to the application program which is using the object and is otherwise uninvolved in the topological management methods of the present invention.

A resource name (hereinafter referred to as RN) is a field which has a tag name and a presently assigned value. A resource 200 is uniquely defined by one or more resource names (stored within a resource aspect 202 as described below). Specifically, a resource 200 is uniquely identified by the transitive closure of the union of all resource names stored within all RAs 202 which are currently managed as aspects of the resource 200.

For example, in the following hypothetical set of data constructs:

Resource:Person1
      RA:Employee
        ResourceNames:
          SSN:123456789
          EMPNO:11221
      RA:CreditUnionMember
        ResourceNames:
          SSN:123456789
          ACCTNO:998761
    Resource:Person2
      RA:Employee
        ResourceNames:
          SSN:987654321
          EMPNO:21212
      RA:CreditUnionMember
        ResourceNames:
          SSN:987654321
          ACCTNO:66884 resource Person1 is known by the transitive closure of all resource names, namely: SSN:123456789, EMPNO:11221, and ACCTNO:998761, while resource Person2 is known by the its unique resource names, namely SSN:987654321, EMPNO:21212, and ACCTNO:66884.

The RNs which uniquely define a resource 200 are supplied by the application programs using the methods of the present invention. An application program utilizing the present invention provides an RA 202 including one or more RNs identifying a specific resource 200, and requests that the object be managed by the topological management methods of the present invention. RNs not previously supplied in an object by another application program are thereby added to the collection of known characteristics (RNs) of the specified resource 200. Each RA 202 identifies the associated resource 200 by its particular subset of RN values. The resource 200 is therefore the union or integration point for all resource names known in all RA 202 subsets of the RNs.

The objects supplied to the topological management system are managed by associating each object with the resource 200 uniquely identified by the supplied RNs. If the supplied RNs do not identify an existing resource 200, a new resource 200 is automatically created. Therefore, each resource 200 is associated with one or more RAs 202. Each RA 202 associated with a resource 200 is said to represent one particular aspect of the resource 200.

Application programs which use the topology management methods of the present invention may each utilize different subsets of the resource names defining a resource 200. For example, one application program may be concerned with a "person" resource as an "employee" while another application may view the same person as a "club member." Similarly, one application may view a "network" resource as a "TCP/IP local area network" and concern itself with manipulation of RNs relating to that aspect of the "network" resource. Yet another application may be concerned with the "wide area network" aspect of the "network" resource RNs. Each subset of the RNs of a resource 200 is referred to as an "aspect" and is represented by at most one RA 202.

Each RA 202 is in a one-to-one relationship with a resource aspect type 212 (hereinafter referred to as RAT). A resource 200 may be represented by several aspects (several RAs may fully describe one resource from the perspective of several different application program aspects). Therefore, there is shown a many-to-many "classifies" relationship 220 between RAs 202 and RATs 212. Built-in rules (also referred to as invariants) within the present invention precludes a resource from being represented by more than one RA 202 classified by a particular RAT 212 (or a particular RAT 212 and a specialization of that type as discussed below).

The RAT 212 constrains the types of relations in which the related RA 202 may participate. A set of rules associated with the RAT 212 defines the constraints applied to the aspect of a resource 200 represented by an RA 202. The constraints include built-in rules which are predefined and allow for limited customization, and extensible rules which may be completely defined by the application programmer. Part of the configurable rules defined in the each RAT 212 is a list of previously defined, named roles through which the associated RA 202 may participate in associations (this is discussed in more detail below).

Consistent with the Object Oriented Design and Analysis which forms the basis for use of the present invention, RATs 212 are defined as a class or may be defined as a specialization of a previously defined RAT class. A specialization of a previously specified class inherits all properties of the previously defined class and specifies additional attributes and constraints. For example, "permanent employee" and "temporary employee" may be two resource aspect type specializations of an RAT 212 which specifies the constraints for the "employee" resource aspect type. In the sense that a specialization of an RAT 212 inherits all the RATs 212 properties, the newly defined specialization RAT 212 is in a "specializes" relation with the previously defined RAT 212 as indicated by the relation 214.

Exemplary of the built-in rules relating to resources is that each RA 202 represents one aspect of one "thing." This constraint is specified by stating that each RA 202 is associated with only one RAT 212 and no resource 200 can be represented by two RAs 202 classified by the same RAT 212 (or by two RAs where the RAT classifying one RA is a specialization of the RAT classifying the other RA). The constraints specified by each RAT 212 are discussed in more detail below.

Resources 200 are not explicitly managed by application programs utilizing the topological management methods of the present invention. Rather, the topological management methods create, modify, and destroy resources 200 based on the resource aspects 202 provided to the methods for topological management. In other words as objects are provided to the topological management services with a request that the object be managed, resources 200 are created, destroyed, or modified based on the resource names provided with the RA 202. Conversely, when a managed RA 202 is identified by an application program with a request that the object become unmanaged, related resources 200 are created, destroyed, or modified as appropriate to the remaining resource names known with respect to an affected resource 200. The methods of the present invention which create, destroy, and modify resources 200 are discussed below in further detail.

ASSOCIATIONS

Associations 204 define interrelationships between two RAs 200. For example, two "person" resources 200, each represented by an RA 202 having an "employee" resource aspect type 212, might participate in a "works for" association 204 to express enterprise personnel organization. The same two resources might also participate in a "works with" association for purposes of the same, or another, application program. Similarly, a "network" resource and a "computing node" resource might participate in a "connected to" association.

Associations 204 are created by an application program using the topological management methods of the present invention to reflect an association between two resource aspects 202. An application program invokes the topological management methods to create a new association. The application provides a list of RAs 202 and a definition of the "role" played by each provided RA in the new association. The use of "roles" in an association is discussed in detail below.

Application programs which use the topology management methods of the present invention may each utilize different interrelationships between resources 200. For example, one application program may be concerned with a "works for" or "works with" association between "person" resources 200 viewed from the "employee" aspect RAs 202 while another application may be concerned with "is the child of" or "is married to" associations between the same two "person" resources 200 viewed from the "family member" aspect RAs 202.

TOPOLOGY INVARIANTS—RULES ROLES, ENFORCERS, AND NOTIFICATION RECEIVERS

Built-In Invariants (rules):

The topological management service of the present invention includes built-in rules to reject certain inappropriate requests generated by a client application program. The methods of the present invention reject any request made by a client application program which would result in a resource 200 being represented by:

two or more RAs 202 classified by the same RAT 212, or two or more RAs 202 where the RAT 212 classifying one RA is a specialization of another RAT.

Configurable Invariants (roles):

Other rules are configurable by the client application program, and are defined and stored with an RAT 212. The RAT 212 associated with each RA 202 defines a set of rules which enumerates the permitted association roles for that RAT 212. Specifically, the rules in each RAT 212 list the roles which are permitted for the related RA 202 in forming associations 204 with other RAs 202. By applying these rules, the methods of the present invention prevent the formation of invalid association 204 between resources 200 as represented by the RAs 202. As discussed above, an association 204 is created by a client application program providing two RAs 202 to be associated and the desired role for each specified RA. The desired association is only formed if the RAT 212 which relates to each provided RA includes a rule which permits the formation of the association with the specified roles used for the specified RAs 202.

In addition to specifying the permitted roles for forming associations, the rules defined and stored with an RAT 212 specify other attributes for permitted associations. Specifically, each rule specifies the RAT 212 which is to be used for the other RA 202 which forms the permitted association. In addition, the rule specifies the minimum and maximum cardinality of such associations which are permitted. A minimum cardinality indicates that an RA 202 classified by the RAT 212 defining the rules must participate in at least that number of such associations 204 with other permitted RAs 202. A maximum cardinality indicate that the RA 202 may not participate in more than that number of such associations 204.

Extensible Constraints (enforcers):

In addition to the built-in and the configurable invariants, a client application program may define application specific rules (enforcers) to verify the validity of other changes to the topologically managed enterprise database. Enforcers 216 are defined by the application program by providing a programmed function to be performed to verify the propriety of any changes to a particular resource. The enforcer 216 programmed function is invoked to verify any proposed changes to a resource related to the RAT 212 which defined the enforcer 216. The enforcer 216 function is provided with the resource 200 and the RAT 212 as inputs, evaluates the propriety of the proposed changes to the resource, and returns a value indicative of the propriety of the proposed change. The proposed changes are rejected by the topological management methods if any enforcer function return a value indicative of an improper change to the resource. Enforcers 216 provide the application program the maximum flexibility to verify the consistency and propriety of the resources in the topologically managed enterprise database.

Notification Receivers:

Notification receivers 226 are objects which are related 222 to an RAT 212 to define an interface for reception of a notification of a change of a particular RAT 212 in a managed topology. A notification receiver object is related to one or more predefined trigger conditions each of which is "triggered" when a particular predefined type of change is made to a related RAT 212 in the topology.

Notification receivers 226 are also related 224 to an RA 202 to define an interface for reception of a notification of a change of a particular RA 202 in a managed topology. A notification receiver object is related to one or more predefined trigger conditions each of which is "triggered" when a particular predefined type of change is made to a related RA 202 in the topology.

The notification receiver feature permits a first application program to be notified when a second application program changes the topology in a manner which may affect the first application program.

RESOURCE INTEGRATION

The topological management methods data constructs (described above) and the associated methods of the present invention permit different application programs to view and manipulate a common resource each using a different resource aspect. Each application's resource aspect is defined by an RAT 212 data construct and is embodied in a related RA 202 data construct which is classified by the RAT 212. Each resource aspect is capable of being manipulated independent of all other resource aspects of the same common resource.

The data constructs and associated methods of the present invention recognize when several resource aspects in fact refer to the same resource by the resource names (RN) given to the RA 202. This is accomplished by "representing" a resource 200 by each of the RAs 202 in a "resource name closure set." As used herein "representing" means that resources 200 are not referenced directly by client application programs, but rather indirectly through the RAs 202 which "represent" the resource. A "resource name closure set" is the largest set of resource aspects (RAs 202) such that each resource aspect in the set shares at least one resource name (RN) with at least one other resource aspect of the set. In other words it is the transitive closure of the intersection of resource names for resource aspects (RAs 202). The resource name closure set identifies a resource 200 as the set of resource aspects (RAs 202) representing the resource 200.

Any validated (by application of all invariants and enforcers) changes to the topological enterprise database may affect the resource integration. New resource names provided by a newly managed object provided to the topological management service of the present invention may alter the resource name closure set to thereby necessitate modifications to the resources 200 known to the topological management service.

Figure 3:
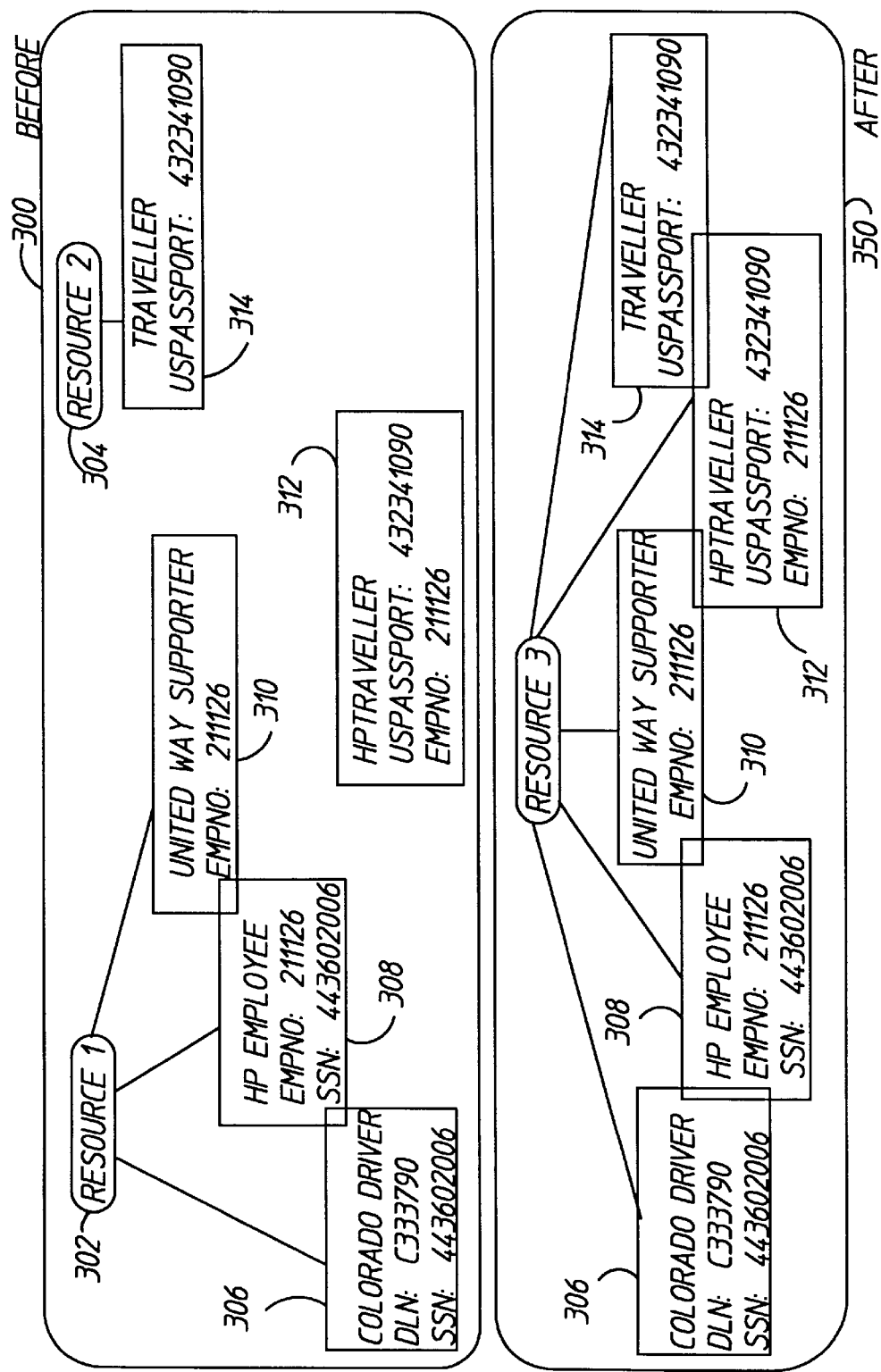
FIG. 3 conceptually depicts the resource integration of the API structures and methods of the present invention as caused by management of a previously unmanaged object.

FIG. 3 shows a specific graphical example of the operation of resource integration on an exemplary topology. The detailed operation of the methods used to manage a topology, and specifically resource integration of a managed topology, is discussed below. Topology 300 is a snapshot of a managed topology before the addition of a new object to be managed under the topology. RESOURCE1 302 and RESOURCE2 304 are two resources in the managed topology. In this exemplary topology both resources represent "person" resources. RESOURCE1 302 is "represented" by resource aspects (RAs) 306, 308, and 310 while RESOURCE2 304 is "represented" by resource aspect 314. The resource name closure set for RESOURCE1 302 is resource aspects 306, 308 and 310 because that is the largest set of RAs which all share at least one resource name (RN) with at least one other RA. Similarly, the resource name closure set for RESOURCE2 304 is the single RA 314. The topology management service of the present invention understands the total set of managed RAs (306, 308, 310, and 314) to represent two separate resources (persons), namely RESOURCE1 302 and RESOURCE2 304. Object 312 in topology 300 (before) has not yet been provided to the topology management service to be managed in the topology.

Topology 350 represents a snapshot of the same topology after the addition of object 312 to the set of topologically managed objects. In topology 350, object 312 has now been provided to the topology management service and thereby becomes a resource aspect 312. Because of the validated change to the managed topology, the resource name closure set is determined again by the topology management service for all managed resources. The newly managed RA 312 has a resource name shared by RA 310 and another resource name shared by RA 314. Therefore, the resource name closure set now includes all managed RAs in topology 350, namely 306, 308, 310, 312, and 314. RESOURCE1 302 and RESOURCE2 304 cease to exist as distinct resources and a new resource, RESOURCE3 316, is now represented by the entire set of RAs, namely 306, 308, 310, 312, and 314.

In FIG. 3, topology 350 is labelled as the result of adding object 312 to topology 300. The reverse operation can also be seen in FIG. 3 by simply reversing the "before" and "after" labels. In other words, if topology 350 were the initial condition of a managed topology, and the user requested that currently managed RA 312 be removed from the management services of the topology management service, then topology 300 would result. Specifically, when RA 312 is removed from topology 350, the resource name closure set determination reveals that there are now two, apparently, distinct resources where there was one. RESOURCE3 316 of topology 350 would be destroyed and RESOURCE1 302 and RESOURCE2 304 would be created in its place.

Figure 4:
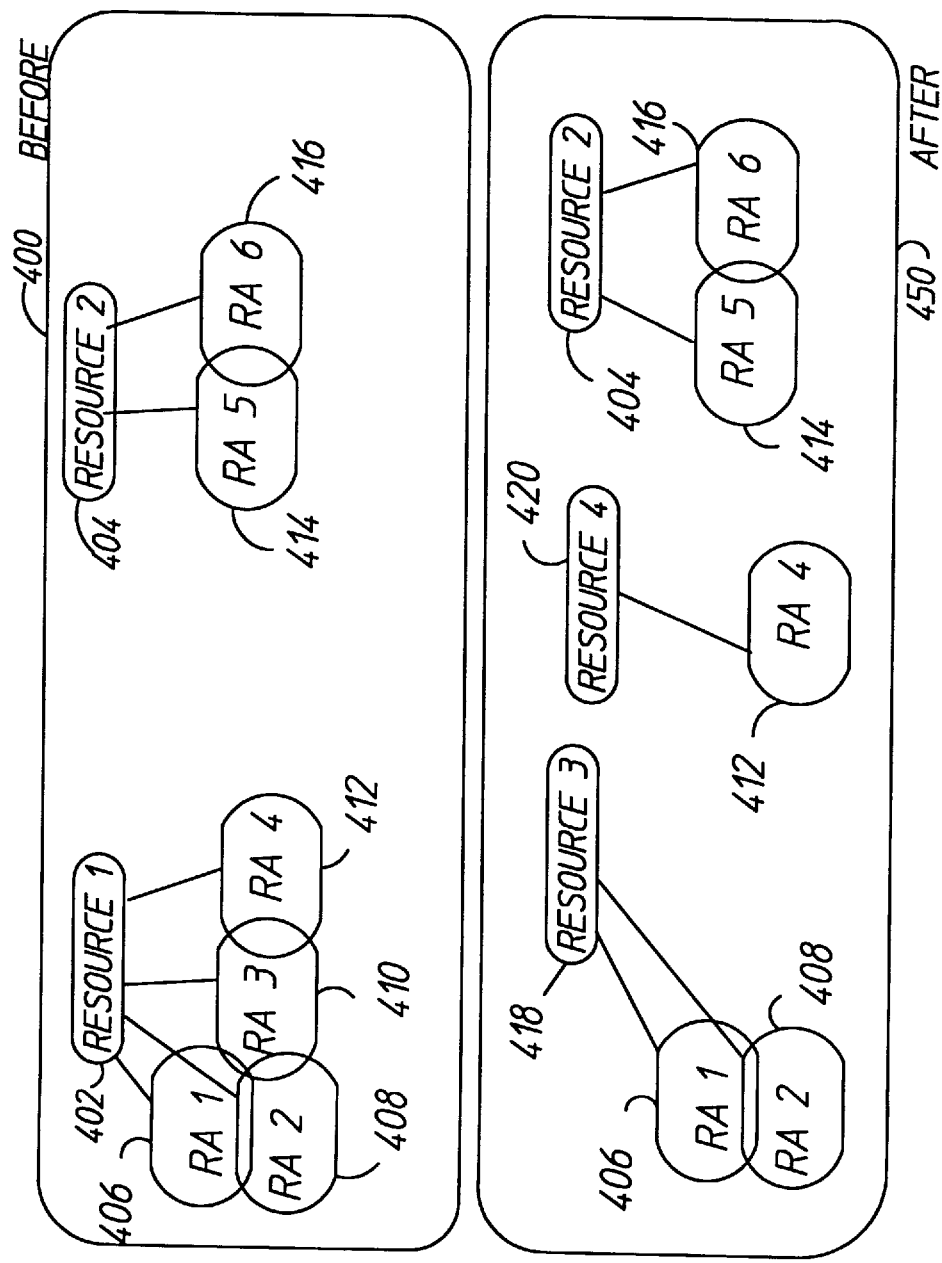
FIG. 4 conceptually depicts the resource integration of the API structures and methods of the present invention as caused by the unmanagement of a previously managed resource aspect.
Figure 5:
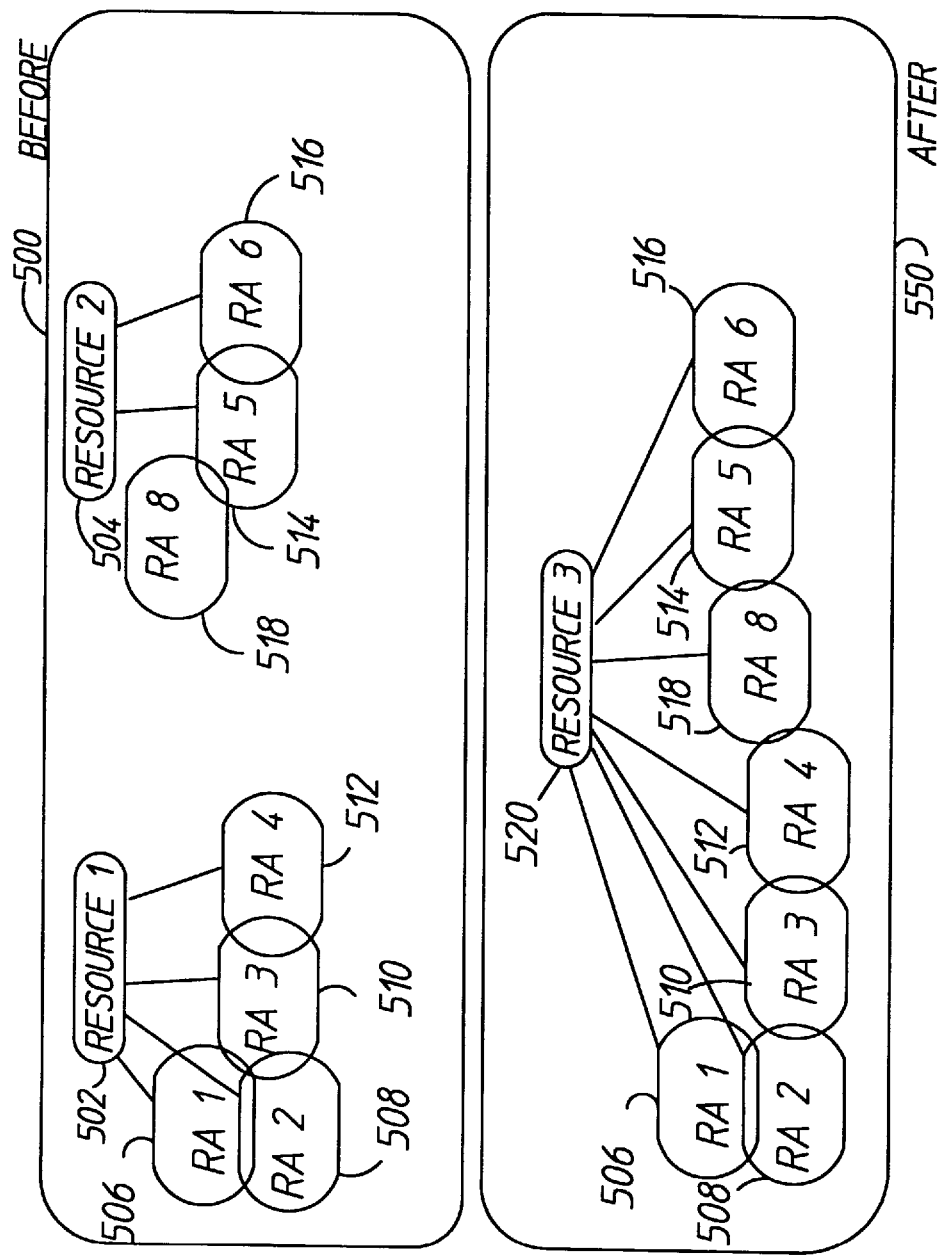
FIG. 5 conceptually depicts the resource integration of the API structures and methods of the present invention caused by the addition of a resource name to an existing managed resource aspect.
Figure 6:
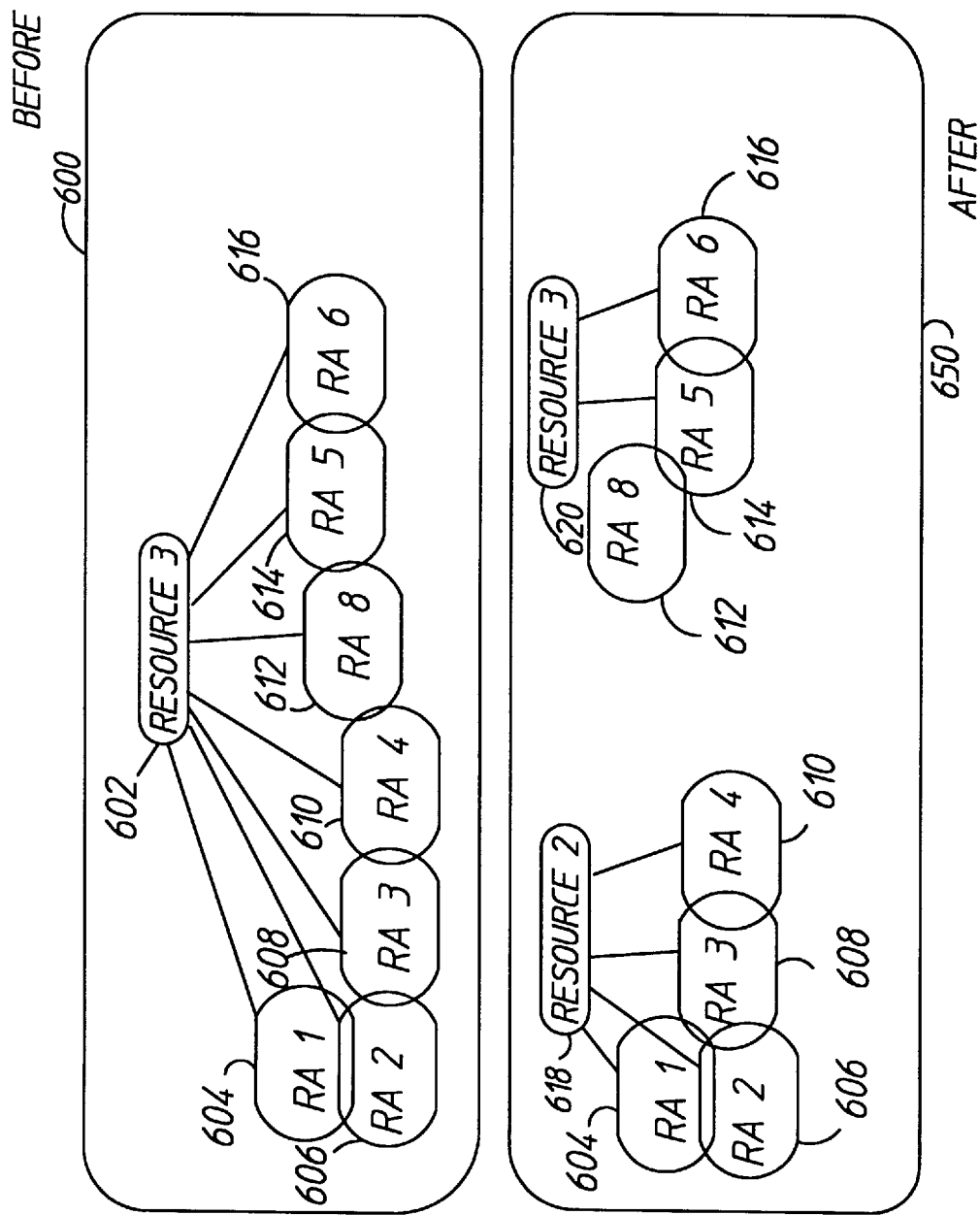
FIG. 6 conceptually depicts the resource integration of the API structures and methods of the present invention caused by the removal of a resource name from an existing managed resource aspect.

The topology management service of the present invention determines the resource name closure set after any change in the topology which may affect the relationship between resources and resource aspects. FIGS. 4–6 depict additional alterations made by the topology management service in response to other types of changes which affect the topology resource integration. In FIGS. 4–6, the resource aspects are shown only in abstraction with labels such as RA1–RA8. The specific contents of any resource aspect is not relevant to the types of operations which are depicted in FIGS. 4–6.

FIG. 4 depicts the above described reversal of the topology management function in FIG. 3. In FIG. 4, the initial state of topology 400 shows the resource name closure set representing RESOURCE1 402 to be RA1 406, RA2 408, RA3 410, and RA4 412 while the resource name closure set representing RESOURCE2 404 is RA5 414 and RA6 416. If RA3 410 is removed from the management service ("unmanaged"), then topology 450 results wherein RESOURCE1 402 is destroyed and two new resources, RESOURCE3 418 and RESOURCE4 420, are created in its stead. The unmanaging of RA3 410 breaks the sharing of at least one resource name between the previous members of the resource name closure set representing RESOURCE1 402. New RESOURCE3 418 is represented by RA1 406 and RA2 408 while new RESOURCE4 420 is represented by RA4 412. RESOURCE2 404 is unaffected by this change.

The resource name closure sets of resources in a topology may also be altered by changing the resource names associated with a particular resource aspect. If resource names are associated with, or disassociated with, managed resource aspects, the resource name closure set may also change. The resource names associated with a particular resource aspect are determined by the resource aspect type (RAT) which classifies the resource aspect (RA). FIG. 5 depicts the changes to a topology caused by addition of a resource name to a resource aspect. Topology 500 depicts an initial state of a managed topology in which there are two resources, RESOURCE1 502 and RESOURCE2 504. RESOURCE1 502 is represented by its resource name closure set RA1 506, RA2 508, RA3 510, and RA4 512. RESOURCE2 504 is represented by its resource name closure set RA5 514, RA6 516, and RA8 518. If a new resource name (RN) is added to RA8 518 and the new RN is shared with RA4 512, then topology 550 results from the topology management determination of resource name closure sets of all resources. RESOURCE1 502 and RESOURCE2 504 are destroyed and a new resource, RESOURCE3 520, is created in their place. RESOURCE3 520 is represented by the new resource name closure set which comprises all RAs known to the topology management service. The addition of the new RN to RA8 518 effectively joined the two, previously distinct, resources by joining their respective resource name closure sets. It will be readily recognized that the same result may be produced by adding a new RN to RA4 512 which is shared by RA8 518, or similarly, with any pair of RAs, one of which is in a first closure set and the other in another closure set.

FIG. 6 depicts the reversal of the operations performed by the topology management service in FIG. 5. In FIG. 6 a resource name (RN) previously shared by two resource aspects is removed from one of the resource aspects to thereby split the common resource into two new resources. In an initial state, topology 600 is shown to be managing one resource, RESOURCE1 602, represented by all RAs, namely RA1 604, RA2, 606, RA3, 608, RA4 610, RA5, 614, RA6 616, and RA8 612. After removing a resource name from RA8 612, specifically the only resource name which was shared between RA8 612 and RA4 610, topology 650 results from the determination of new resource name closure sets. In topology 650, RESOURCE1 602 is destroyed and replaced by two new resources, RESOURCE2 618 and RESOURCE3 620. RESOURCE2 618 is represented by its resource name closure set comprising RA1 604, RA2 606, RA3 608, and RA4 610, while RESOURCE3 620 is represented by the closure set of RA5 614, RA6 616, and RA8 612. The deletion of an RN from RA8 612 effectively splits the resource by splitting the resource name closure sets. It will be readily recognized that the same result may be produced by removing an RN from RA4 610 which is shared by RA8 612, or similarly, with any pair of RAs in the same resource name closure set which share only the removed resource name.

It will be readily recognized that the data constructs described above may be represented and manipulated by any of several standard programming techniques.

EXEMPLARY APPLICATIONS
SIMPLE EXAMPLE

This example demonstrates how a developer can use the topology management service of the present invention to develop a solution to an application-specific problem.

The service department of a manufacturer manages all electrical devices used throughout the company. The department requires a system to assist them in managing their inventory of electrical devices.

Among the many functional requirements of the system is a requirement to keep track of the power outlets being used for electrical devices. The department manages both 110 V and 220 V electrical devices. Some power outlets are 220 V whereas others are 110 V. The department wants to ensure that 110 V electrical devices are not allocated to be plugged into 220 V power outlets and that 220 V devices are not allocated to be plugged into 110 V power outlets.

The application developer could choose to solve the problem of maintaining the associations between electrical devices and power outlets without the use of the topology management service. However, the developer would then need to implement code to:

capture semantic constraints on associations and ensure that the semantics are maintained
  store and maintain association information
  query associations.

Furthermore, by not using the topology management service, other applications may find it difficult to integrate with the new application. For example, the Information Technology department may wish to integrate with the electrical maintenance application to keep track of power connections for computers. The present invention provides the concept of resources so that the Information Technology department's view and the electrical maintenance department's view of the same power connection can be recognized as being different views of the same thing. One department can locate a connection using a topology query and then access the other department's data (as well as its own) that relates to this power connection.

Defining the "topology" is part of the Object Oriented Analysis and Design process of the particular problem. It consists of defining a set of resource aspect types and the inheritance relations between these types.

The application developer must choose the appropriate level of abstraction for his problem. For example, a serial connection between two computers may be modelled simply as a "connection" resource that has associations with two "computer" resources. Alternatively, the serial connection may be modelled as a "serial card" resource associated with a "cable" which is in turn associated with another "serial card."

One aspect of defining a "topology" is to define the resource aspect types to be used. Each resource aspect managed by a topology is classified by one resource aspect type. Resource aspect types constrain the associations in which a resource aspect of that type can participate. Resource aspect type rules are used to specify the configurable aspects of the semantics of a resource aspect type. Each resource aspect type rule specifies a role name, a minimum and maximum number of associations in which the resource aspect must participate in an association with that role, and the resource aspect type with which this resource aspect type can be associated. Table 1 shows the resource aspect type rules used for this example:

TABLE 1

Resource aspect type (RAT) Rules

| RAT | Rules | | | |
|---|---|---|---|---|
| | Role | Min | Max | Associated RAT |
| Electrical_Device | Sink | 0 | 1 | Power_Supply |
| 110 V_Device | Sink | 0 | 1 | Power_Supply |
| | Sink | 0 | 1 | (inherited) 110 V Power |
| 220 V_Device | Sink | 0 | 1 | Power_Supply |
| | Sink | 0 | 1 | (inherited) 220 V Power |
| Power_Outlet | Source | 0 | 1 | Power_Supply |
| 110 V_Outlet | Source | 0 | 1 | Power_Supply |
| | Source | 0 | 1 | (inherited) 110 V Power |
| 220 V_Outlet | Source | 0 | 1 | Power_Supply |
| | Source | 0 | 1 | (inherted) 220 V Power |
| Power_Supply | Sink | 1 | 1 | Electrical_Device |
| | Source | 1 | i | Power_Outlet |
| 110 V_Power | Sink | 1 | 1 | Electrical_Device |
| | Sink | 1 | 1 | (inherited) 110 V_Device |
| | Source | 1 | 1 | Power_Outlet (inherited) 110 V_Outlet |
| 220 V_Power | Sink | 1 | 1 | Electrical_Device |
| | Sink | 1 | 1 | (inherited) 220 V_Device |
| | Source | 1 | 1 | Power_Outlet (inherited) 220 V_Outlet |

The table shows how rules specified for a more generalized type also apply to specializations of that type. For example, a resource aspect typed as a 110 V_Device must participate in associations (on its Sink role) with resource aspects that are classified as both Power_Supply and 110 V_Power by resource aspect types (RATs). Both rules apply. As it turns out, a resource aspect of type 110 V_Power will comply with both rules because a resource aspect type 110 V_Power is a specialization of the Power_Supply resource aspect type. However, a resource aspect type of Power_Supply will not comply with both rules and so is invalid.

With the topology semantics defined, the developer can now use topology to create, update, delete, and query associations between resource aspects. The following table 2 specifies the resource aspects for the electrical devices:

TABLE 2

Resource aspects

| Resource aspect | Resource aspect Type |
|---|---|
| VDU | 220 V_Device |
| Tape_Unit | 220 V_Device |
| Paper_Shredder | 110 V_Device |
| X_Terminal | 110 V_Device |
| PC | 110 V_Device |
| PO-110-1 | 110 V_Outlet |
| PO-110-2 | 110 V_Outlet |
| PO-110-3 | 110 V_Outlet |
| PO-220-1 | 220 V_Outlet |
| PO-220-2 | 220 V_Outlet |
| P1 | 220 V_Power |
| P2 | 220 V_Power |
| P3 | 110 V_Power |
| P4 | 110 V_Power |
| P5 | 110 V_Power |

With the specified constraints, the developer can create the following associations:

TABLE 3

Valid associations

| Resource Aspect | Role | Resource Aspect | Role |
|---|---|---|---|
| P1 | Source | PO-220-1 | Source |
| P1 | Sink | VDU | Sink |
| P2 | Source | PO-220-2 | Source |
| P2 | Sink | Tape_Unit | Sink |
| P3 | Source | PO-110-1 | Source |
| P3 | Sink | Paper_Shredder | Sink |
| P4 | Source | PO-110-2 | Source |
| P4 | Sink | X_Terminal | Sink |
| P5 | Source | PO-110-3 | Source |
| P5 | Sink | PC | Sink |

The problem to be solved specifies that 110 V_Devices are not able to form associations with 220 V_Outlets and visa versa. The resource aspect rules ensure that these restrictions are enforced in the enterprise topological database. The cardinality constraints expressed for the 110 V_Devices and 220 V_Devices ensure that each device can only participate in one association with an appropriate Power_Supply resource aspect. Similarly the cardinality constraints on the 110 V_Outlets and 220 V_Outlets ensure that each is associated with only one Power_Supply. This combination of rules ensures that only one device of the appropriate power rating will be plugged into each outlet of the same power rating.

The developer can pose queries on the topological stored information base. Only very simple queries can be demonstrated for this example. Some possible queries may include:

Which outlets are the 220 V Devices connected to?

Is the paper shredder plugged into power outlet PO-220-1?

Which device is plugged into power outlet PO-110-3?

NETWORK TOPOLOGY SERVICE EXAMPLE

Logical Network Layer Topology Model:

This example topology utilizes the topological management service of the present invention to manage a logical network. This topological model is generalized enough that it may be used with appropriate specializations of the resource aspect types to manage the topology of, for example, a TCP/IP network, a Novell network, a Vines network, or most other commercially available network models. This topology is composed of a "logical_network" which further comprises a collection of objects and associations between the objects. The logical_network has a basic set of objects and associations common to most network topologies and can therefore be used to manage the topology of most commercially available networks. In addition, any specific network implementation, (an IP network for example), has network specific semantic rules which must be followed. This logical_network topology model defines the basic network objects and associations without regard to specific network semantics.

The objects managed by this exemplary application of the topology management service of the present invention are depicted graphically in FIG. 20 (as well as described in tables below).

Figure 20:
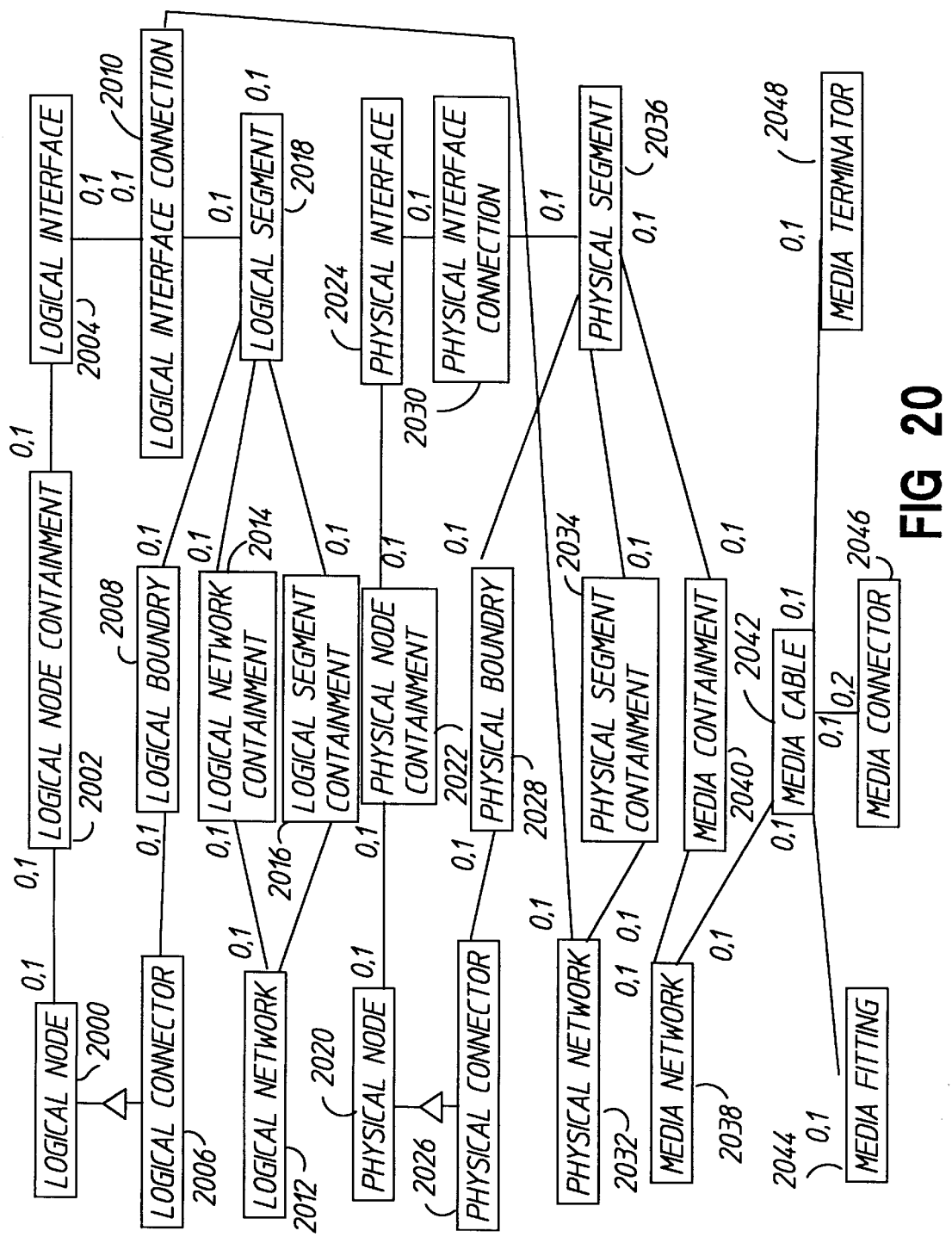
FIG. 20 depicts a graphical design view of an exemplary IP network topology comprising objects managed by the API structures and methods of the present invention.

A logical_network 2012 of FIG. 20 is an aggregation of the objects which participate in the network and any related associations. Not all objects shown must participate in a specific network implementation. That is, some network semantics may not make use of a given object or association. The resource aspect types defined in this model are:

| | |
|---|---|
| logical_node | A logical_node 2000 contains zero or more logical_ifs 2004 (logical interfaces). A logical_node 2000 is a member of zero or more logical_segments 2018 by virtue of a single logical_if 2004. |
| logical_if | A logical_if 2004 (logical interface) is contained by a single logical_node 2000. A logical_if 2004 is connected to a single logical_segment. A logical_if 2004 implies that a logical_node 2000 is a member of a logical_segment 2018. |
| logical_segment | A logical_segment 2018 is connected to zero or more logical_ifs 2004. A logical_segment 2018 is bounded by zero or more logical_connectors 2006. A logical_segment 2018 may contain another logical_network 2012 to define additional layers of detail of a logical_network 2012, or may contain a physical_network 2032 (which thereby ends the nesting definitions of logical_networks). |
| logical_connector | A logical_connector 2006 is a specialization of a logical_node 2000. A logical_connector 2006 bounds zero or more logical_segments 2018. |
| logical_network | A logical_network 2012 contains zero or more logical_segments 2018 and is contained by zero or more logical_segments 2018. That is, a logical_segment 2018 at a given protocol layer is implemented by a logical_network 2012 at a lower protocol layer. |

The relationship between logicaL_segment 2018 and logical_network 2012 requires additional explanation. Note that a logical_segment 2018 contains a single logical_network 2012. In this sense, a logical_segment 2018 at one layer defines a logical_network 2012 at the layer below it. In this manner the layered models of most network products may be represented in the topological constructs of the present invention. An entire layer of a network "protocol stack" may be represented as a logical_segment 2018 within the layer above it. The seven layer ISO and the TCP/IP layered models are exemplary of such layered protocol stacks. However, note also that a logical_network 2012 may be contained by multiple logical_segments 2018. Other logical_networks 2012 (perhaps reflecting other protocols implemented at the same protocol layer) may also contain the same lower logical_network 2012, hence the given cardinality. For example, in TCP/IP network communications, several TCP protocol applications (ftp and telnet for example) may utilize the same underlying TCP layer (which in turn utilizes the IP layer, which in turn utilizes the lower link layers).

The containment, connection, and bounding associations described above are represented in the model as resource aspect types. These RATs are used to associate one element of the logical network with another.

| | |
|---|---|
| logical_network_containment | 2014 associates a logical_network 2012 with its containing logical_segment 2018. |
| logical_segment_containment | 2016 associates a logical_network 2012 with its contained logical_segments 2018. |
| logical_node_containment | 2002 associates a logical_if 2004 with its containing logical_node 2000. |
| logical_interface_connection | 2010 associates a logical_segment 2018 with its connected logical_if 200. |
| logical_boundary | 2008 associates a logical_segment 2018 with its bounding logical_connectors 2006. |

Using this model it is possible to construct a representation of a network at a given protocol layer. With the relationship between a logical_segment 2018 and other logical_networks 2012, it is possible to build up multiple networks, each representing a protocol layer, and relate higher order layers onto the lower order layers they depend on.

Figure 10:
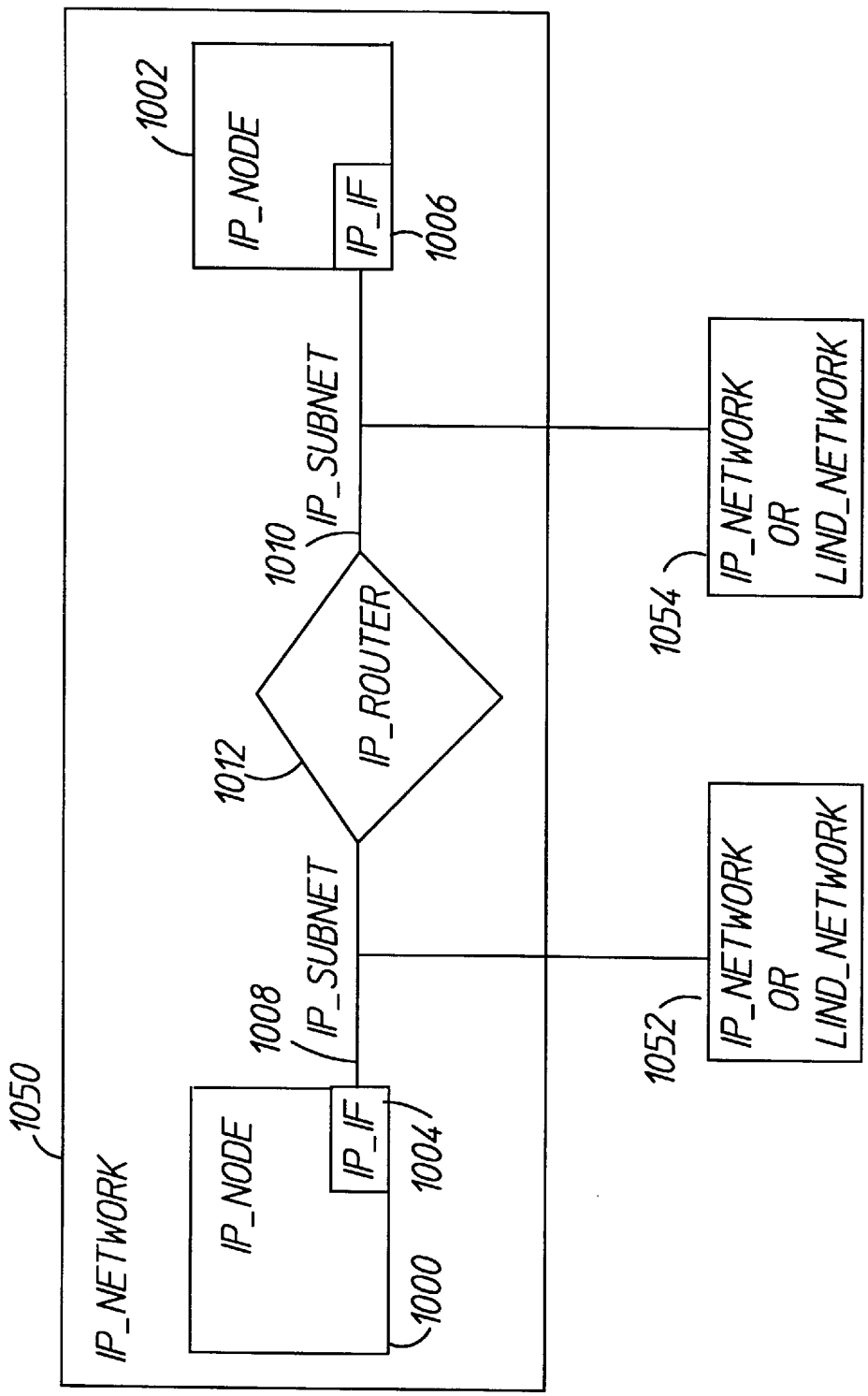
FIG. 10 depicts an object oriented analysis and design view of an exemplary IP network topology managed by the API structures and methods of the present invention.

For example, consider ip_network 1050 of FIG. 10. In this example ip_nodes 1000 and 1002 are each a specialization of the resource aspect type logical_node. Similarly, ip_if 1004 and 1006 are each a specialization of the resource aspect type logical_if, ip_router 1012 is a specialization of logical_connector, and ip_subnet 1008 and 1010 is each a specialization of logical_segment. The ip_subnet 1008 and 1010 (logical_segment) objects are supported by a complete logical_network at a lower layer (consisting of nodes, interfaces, segments, and possibly connectors). The ip_subnet 1008 is said to contain this lower order network, namely ip_network 1052 and ip subnet contains ip_network 1054. A more complete example, showing multiple layers and their relationships, is presented below.

Physical Network Layer Topology Model:

The physical_network 2032 model of FIG. 20 is slightly different from the logical_network 2012. For the most part, it is a specialization of the logical_network 2012 model described above. The physical_network 2032 topology objects are each largely inherited from the equivalent logical topology object. Physical_segments 2036 are bounded by physical_connectors 2026 through physical_boundary objects 2028. Physical_connectors 2026 are specializations of physical_nodes 2020 which contain physical_interfaces 2024 through physical_node_containment objects 2022. Physical_segments 2036 are defined by physical_interfaces 2024 through physical_interface_containment objects 2030. A physical_segment 2036 is contained in a physical_network 2032 by a physical_segment_containment object 2034. A physical_segment 2036, in turn, contains a media_network 2038 through a media_containment object 2040. The key difference from a logical_network model is that a physical_segment 2036 may only contain a media_network 2038 through a media_containment 2040 object, thus providing a termination to the recursion implied by the relationship between logical_segment 2018 and logical_network 2012. In all other respects the physical topology model and the objects within it are derived from the logical topology model. Specifically, since a physical_network 2032 is a subtype (subclass) of logical_network 2012, it can be contained by a logical_segment 2018. In most cases, the lowest level modeled in the Network Topology Service will be the physical_network 2032.

Media Network Layer Topology Model:

The lowest possible network topology layer is the media_network 2038 of FIG. 20. This is basically a collection of hardware that forms the physical transmission medium. Though this layer model is rarely required for network management applications, it is described herein to demonstrate the interrelationship of diverse aspects of the same resources. In some cases, for example, the application developer may want to model this layer for inventory purposes. Another potentially significant use of the media_network 2038 layer model includes verifying that an intended use of a media installation conforms to the requirements of the upper layer protocol. Media network layout might very well be the domain of some other agency within an enterprise, such as a site telecom or communication department, rather than a network management department. However, the topology management services of the present invention permit the integration of all information relating to a managed topology so that a consistent view may be maintained from all aspects of the information.

The media_network 2038 layer objects are intended to be very flexible. A media_cable 2042 might be a line of sight path from one infrared transceiver to another, or a packet radio frequency as well as conductive wiring.

| | |
|---|---|
| media_network | 2038 this is the highest level of the low level media elements contained by a physical_segment 2036. |
| media_terminator | 2048 not all media technologies require termination, but if they do, here it is. |
| media_cable | 2042 a media cable is anything which connects any two other media elements. |
| media_fitting | 2044 this may be a barrel or tee connector in thinLAN Ethernet, a media filter in Token Ring, or anything else found between or at the end of cables. Connectors which are an integral part of the cable, like RJ-45 connectors at the end of a twisted-pair cable, are usually considered part of the cable and are not modelled separately (although there is no restriction saying they can't be). |
| media_connector | 2046 this might be something as simple as a telephone wire punch-down block for twisted-pair, or as complex as a passive, unmanaged Token Ring MAU. |
| media_containment | 2040 is the resource aspect type used to associate a media_network 2038 with its containing physical_segment 2036. |

Network Multi-layered Topology Example:

In FIG. 10 a single layer of an exemplary network was presented. The example shown in FIG. 11 extends the example depicted in FIG. 10 by exploding the lower ip_networks, 1052 of FIG. 10 for example, using all the models described above (the logical, physical and media layers). In the example depicted in FIG. 11 the several objects are shown with the following derivation in table 4:

TABLE 4

Figure 11:
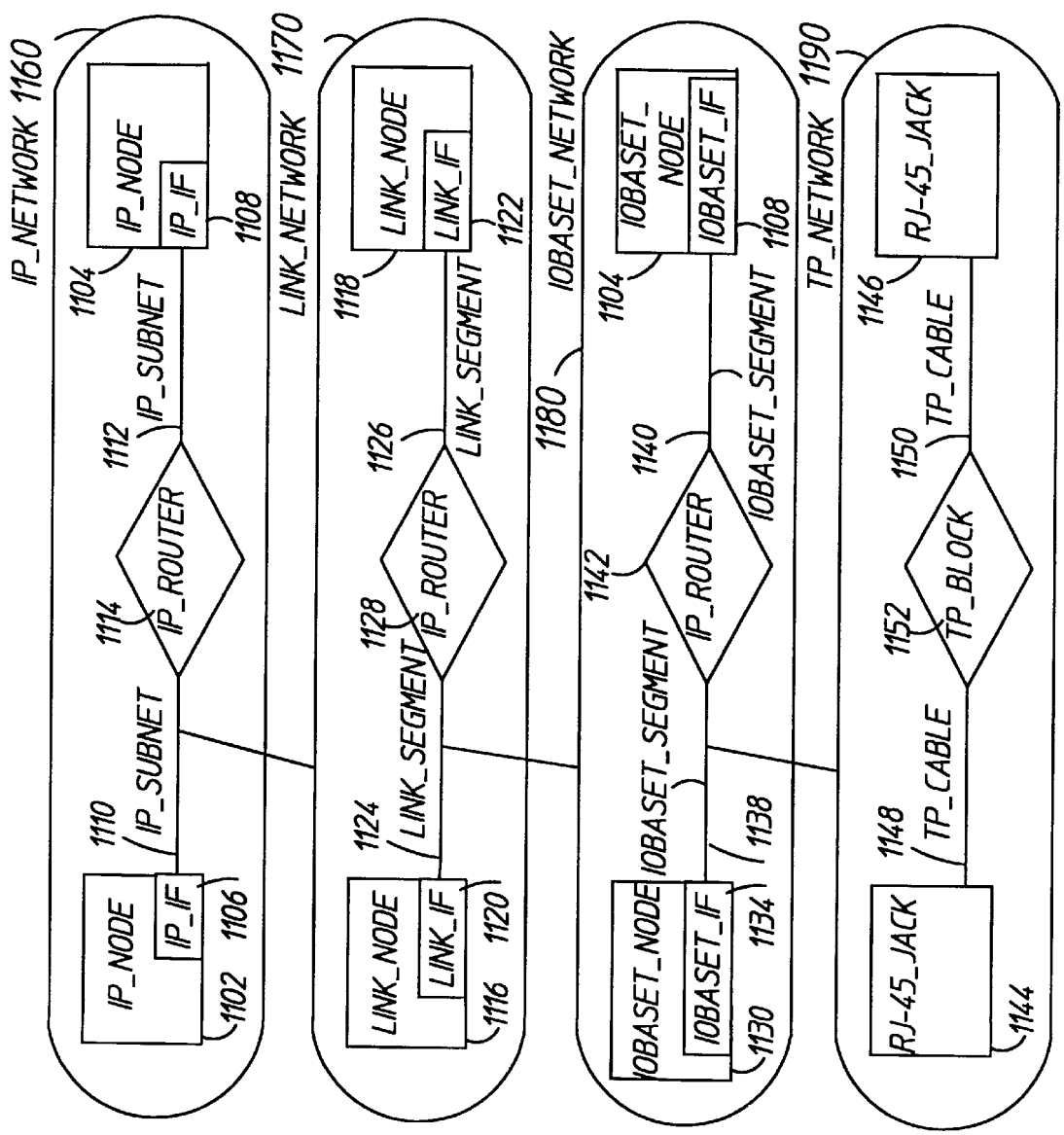
FIG. 11 depicts an object oriented analysis and design view showing additional lower level details of an IP network topology managed by the API structures and methods of the present invention.

| Object Derivations for FIG. 11 | |
|---|---|
| Resource Aspect Type | Specialization of: |
| ip_network | logical_network |
| ip_node | logical_node |
| ip_if | logical_if |
| ip_router | logical_connector |
| ip_subnet | logical_segment |
| link_network | logical_network |
| link_node | logical_node |

TABLE 4-continued

| Object Derivations for FIG. 11 | |
|---|---|
| Resource Aspect Type | Specialization of: |
| link_if | logical_if |
| link_bridge | logical_connector |
| link_segment | logical_segment |
| 10baset_network | physical_network |
| 10baset_node | physical_node |
| 10baset_if | physical_if |
| 10baset_hub | physical_connector |
| 10baset_segment | physical_segment |
| tp_network | media_network |
| RJ-45_jack | media_fitting |
| tp_cable | media_cable |
| tp_block | media_connector |

In FIG. 11 the top level network, as in FIG. 10, is an ip_network 1160 comprising ip_nodes 1102 and 1104 which contain ip_ifs (interfaces) 1106 and 1108, respectively. Each ip_node 1102 and 1104 is connected, through ip_ifs 1106 and 1108, respectively, to ip_router 1114 via ip_subnets 1110 and 1112, respectively. Each ip_subnet 1110 and 1112 comprises a lower level logical_network. lp_subnet 1110 shows its lower level subnet exploded as link_network 1170.

link_network 1170 represents a logical_network layer of a typical ip_network which is using (for example) 802.3 protocols (Ethernet) for data exchange. One of ordinary skill in the art will recognize that similar constructs may be utilized to represent other physical layer models (such as token ring). link_network 1170 comprises link_nodes 1116 and 1118 which contain link_ifs (interfaces) 1120 and 1122, respectively. Each link_node 1116 and 1118 is connected, through link_ifs 1120 and 1122, respectively, to link_bridge 1128 via link_segments 1124 and 1126, respectively. Each link_segment 1124 and 1126 comprises a lower level physical_network. link_segment 1124 shows its lower level subnet exploded as 10baset_network 1180.

10baset_network 1180 represents a physical_network layer of a typical link_network which is using twisted pair transmission devices to exchange data. 10baset_network 1180 comprises 10baset_nodes 1130 and 1132 which contain 10baset_ifs (interfaces) 1134 and 1136, respectively. Each 10baset_node 1130 and 1132 is connected, through 10baset_ifs 1134 and 1136, respectively, to 10baset_hub 1142 via 10baset_segments 1138 and 1140, respectively. Each 10baset_segment 1138 and 1140 comprises a lower level media_network. 10baset_segment 1138 shows its lower level subnet exploded as tp_network 1190.

Tp_network 1190 represents a media_network layer of a typical 10baset_network using RJ-45 twisted pair wiring medium to connect the physical entities of a network. Tp_network 1190 comprises RJ-45_jacks 1144 and 1146. Each RJ-45_jack 1144 and 1146 is connected to tp_block 1152 via tp_cables 1148 and 1150, respectively.

The other ip_subnet 1112 would also contain a lower order logical_network, though not necessarily an 802.3 network. The break down of lower order network and their dependencies for this other ip subnet 1112 would depend on the type of lower order networks it contains. One of the two link_segments, namely 1124, depends on a 10baseT physical network. As above, only one of the link_segments is exploded, and the other link_segment, namely 1126, may or may not be a 10baseT physical network (it might be ThinLAN, or even ThickLAN). Finally, one of the 10baseT segments is shown to depend on a twisted-pair network, derived from media_network. Again, the other segment may or may not be the same type of media (and would not be, in fact, if the other logical_segment at the 802.3 level depended on a ThinLAN or ThickLAN physical network). In the tp_network, we have chosen (primarily for the purposes of illustration) to model the RJ-45_jacks on the interface card as media_connectors, the tp_cables as media_cables, and a punch-down tp_block as a media_connector.

This example shows but one way the object models described above can model such a network topology. The table below describes the resource aspect types and the associations formed between instances of those resource aspect types. These exemplary RATs and associations are usable to model various computing network topologies.

data constructs. The methods of the present invention are invoked by application programs to manage topologies related to the application program. An application program invokes the methods by calling an appropriate function within the API.

Resources 200 of FIG. 2 are managed indirectly through reference to the resource aspects 202 (RAs) which comprise the resource, to the resource aspect types 212 (RATs), and associations 204. Functions described below directly manipulate these data constructs. Indirect side effects of these manipulations alter the definition of resources (200) in a topology.

Each function of the API of the present invention is described below in a common format which discloses the operation of each API function. Most functions discussed

| Resource-aspect Type (RAT) | Rules | | | |
|---|---|---|---|---|
| | Role | Min | Max | Associated RAT |
| logical_network | network | 0 | 1 | logical_network_containment |
| | network | 0 | 1 | logical_segment_containment |
| logical_network_containment | container | 0 | 1 | logical_network |
| | container | 0 | N | logical_segment |
| logical_segment_containment | container | 0 | 1 | logical_segment |
| | container | 0 | N | logical_network |
| logical_node | logical_device | 0 | 1 | logical_node_containment |
| logical_node_containment | container | 0 | 1 | logical_node |
| | container | 0 | N | logical_if |
| logical_if | interface | 0 | 1 | logical_node_containment |
| | interface | 0 | 1 | logical_interface_connection |
| logical_interface_connection | connector | 0 | 1 | logical_if |
| | connector | 0 | 1 | logical_segment |
| logical_segment | segment | 0 | N | logical_interface_connection |
| | segment | 0 | 1 | logical_boundary |
| | segment | 0 | 1 | logical_network_containment |
| | segment | 0 | 1 | logical_segment_containment |
| | segment | 0 | 1 | physical_network |
| logical_boundary | bounds | 0 | N | logcal_segment |
| | bounds | 0 | N | logical_connector (inherited) |
| logical_connector | connection device | 0 | 1 | logical_boundary |
| physical_network | phy_network | 0 | 1 | logical_segment |
| | phy_network | 0 | 1 | physical_segment_containment |
| physical_segment_containment | container | 0 | 1 | physical_network |
| | container | 0 | N | physical_segment |
| physical_node | chasis | 0 | 1 | physical_node_containment |
| physical_node_containment | container | 0 | N | physical_if |
| | container | 0 | 1 | physical_node |
| physical_if | interface | 0 | 1 | physical_node_containment |
| | interface | 0 | 1 | physical_interface_connection |
| physical_interface_connection | connector | 0 | 1 | physical_if |
| | connector | 0 | 1 | physical_segment |
| physical_segment | segment | 0 | N | physical_interface_connection |
| | segment | 0 | 1 | physical_boundary |
| | segment | 0 | 1 | physical_segment_containment |
| | segment | 0 | 1 | media_containment |
| physical_boundary | bounds | 0 | N | physical_segment |
| | bounds | 0 | N | physical_connector (inherted) |
| physical_connector | bounds | 0 | 1 | physical_boundary |
| media_containment | attachment | 0 | 1 | physical_segment |
| | container | 0 | 1 | media_network |
| media_network | media_network | 0 | 1 | media_containment |
| | media_container | 0 | N | media_cable |
| media_terminator | termination | 0 | 1 | media_cable |
| media_cable | physical wire | 0 | 1 | media_terminator |
| | physical wire | 0 | 1 | media_fitting |
| | physical wire | 0 | 2 | media_connector |
| | physical wire | 0 | 1 | media_network |
| media_fitting | cable link | 0 | 1 | media cable |
| media_connector | connector | 0 | 1 | media_cable |

TOPOLOGY MANAGEMENT METHODS API FUNCTIONS: GENERAL

Figure 7:
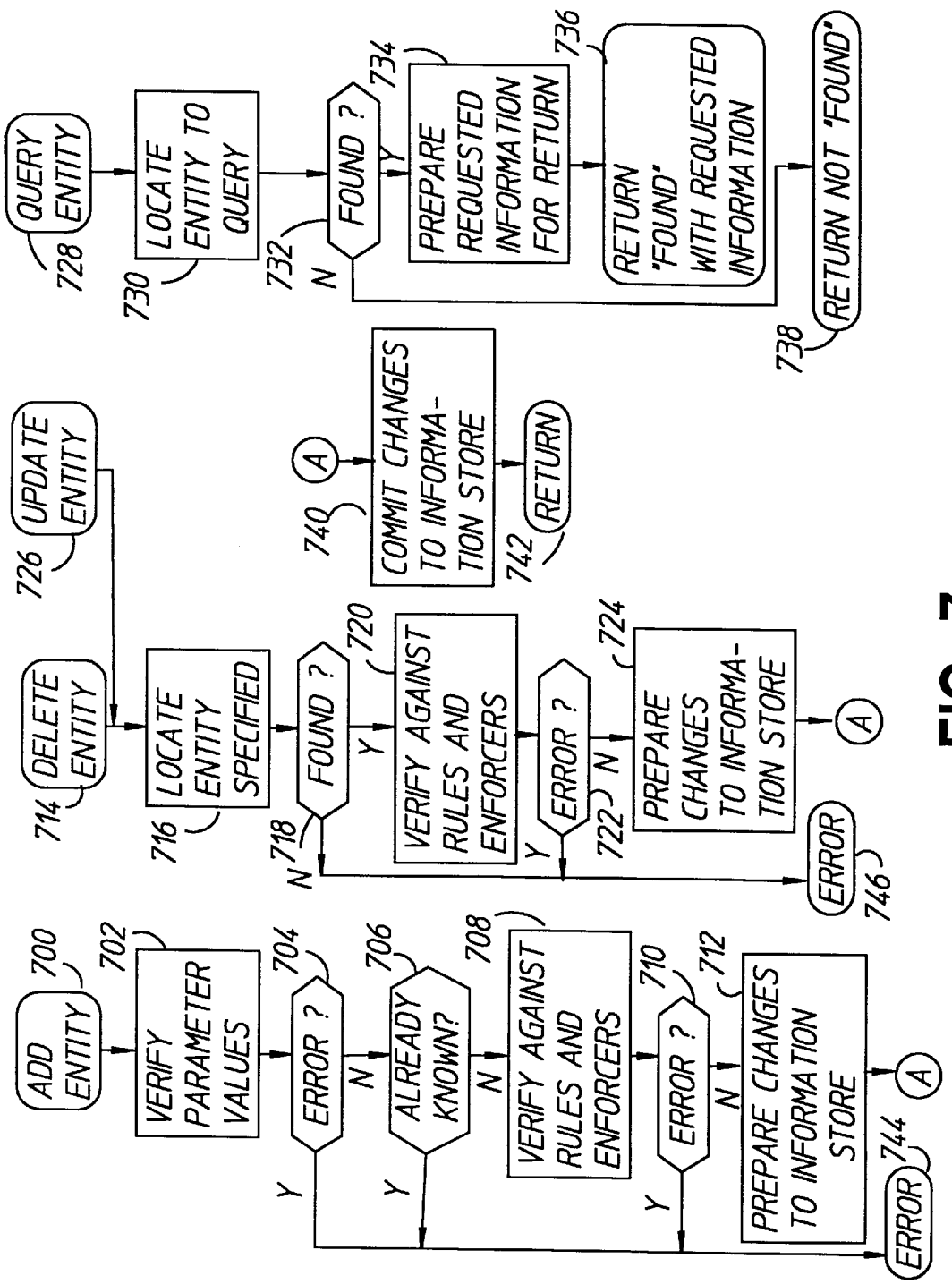
FIG. 7 is a flowchart of the methods of the present invention which manipulate the structures of the present invention to provide general maintenance of topological information.

The present invention comprises the data constructs described above and related methods for manipulating the below operate according to the generalized flowcharts shown in FIG. 7. The flowcharts of FIG. 7 depict the operations of "add", "delete", "update", and "query" relating to an entity to be explicitly manipulated by the related API function. In the context of flowcharts of FIG. 7, entity stands for the data construct being explicitly manipulated by the API function.

The "add entity" operation of FIG. 7 begins at element 700.

Element 702 and 704 operate to verify the parameters provided to the function as input. Element 702 represents the processing of the present method which verifies the parameters passed in to the specific API "add entity" function. If the parameters indicate an unexpected or inconsistent request or value, element 704 operates to transfer processing of the method to element 744 to thereby complete processing of the function and return an error indication to the calling application program.

If the parameters are valid, processing continues with element 706 to verify that the entity to be added is not already known to the topology management service API. If the entity to be added is already known to the system, processing is transferred to element 744 to thereby complete processing of the function and return an error indication to the calling application program. If the entity to be added is not yet known to the API system, processing continue at element 708 to verify the addition of the entity against all topology rules known to the topology service API. If element 710 determines that the addition of the entity violates any currently known topology rules, processing transfers to element 744 to thereby complete processing of the function and return an error indication to the calling application program. If the addition of the entity does not violate any rules known to the topology management service API, processing continues with element 712.

Element 712 operates to prepare all necessary changes to the permanent storage of the API information base stored on disk 114 of FIG. 1. Processing continues with element 740 to commit all previously prepared modifications to the permanent storage of the information base on disk 114 of FIG. 1. The preparation and commitment of the modifications is separated into two elements to permit logging and reversal of changes to the permanently stored information base. All changes prepared for a particular addition, deletion, or update to the permanently stored information base are committed to storage as a single transaction so as to simplify the processing required to "undo" or reverse a particular update.

In addition, element 740 operates to activate any notification receivers (described above) which are associated with any trigger conditions activated by the prepared changes to the information base. Element 740 is also responsible for evaluating the modified topology and adjusting the resource integration as appropriate for the committed changes. The methods applied for resource integration are discussed in additional detail below.

Processing of the add entity operation completes with element 742 which returns a successful status to the application program which invoked the add entity API function. Typically a "handle" is returned to the caller upon successful completion of the add entity operation. The handle is used by the calling application program to identify the data construct just created in future calls to API functions which delete or update the data constructs.

"Delete entity" and "update entity" operations are processed similarly as depicted in the flowcharts of FIG. 7. A delete entity function is invoked by the application program to remove an identified, previously stored, data construct while an update entity modifies or supplements information previously recorded regarding an identified data construct. The data construct to be deleted or modified is provided by the calling application program as a parameter to the delete entity or update entity API function.

The delete entity API function begins at element 714 and the update entity API function begins at element 726. As depicted in the flowcharts of FIG. 7, both functions proceed along a common path of processing. The data construct to be deleted or updated, as identified by the calling application program, is located by operation of element 716. If the entity to be located is not found in the permanent information base on disk 114 of FIG. 1, then element 718 transfers processing of the method to element 746 wherein an error status is returned to the caller and processing of the method is completed.

If the identified data construct is located on disk 114 of FIG. 1, then processing continues with element 720. Element 720 and 722 combine to determine whether the requested deletion or modification adheres to all rules of the affected topologies. The rules and related enforcers are discussed in detail above. If the requested modifications fail to adhere to the rules of the affected topologies, then processing is transferred to element 746 wherein an error status is returned to the caller and processing of the method is completed.

If the requested modifications are permissible under the defined rules of the topologies, then processing continues with element 724. Element 724 operates as does element 712 discussed above to prepare the requested changes to the permanent information base on disk 115 of FIG. 1. Processing then continues with element 740 and 742, as discussed above, to commit the requested changes to the permanent storage, to notify any notification receivers, and to re-evaluate the resource integration of the affected topologies in the permanent storage on disk 114.

The flowcharts of FIG. 7 also depict the processing of a typical query request of the API topology management service. In a query request, the calling application program identifies a data construct for which information is requested, and identifies the type of information required. The processing of the query function returns a failure status to the calling program if the identified data construct is not located or returns a successful status plus the requested information if the identified data construct is located.

Processing of a query function begins at element 728. Element 730 and 732 combine to locate the data construct identified by the calling program. If the identified data construct is not located in the permanent information base stored on disk 114 of FIG. 1, then processing continues with element 738 to return a "not found" status to the calling program.

If the identified data construct is located, then processing continues with element 734 which retrieves the requested information from the permanent information store on disk 114 and prepares the information as appropriate for return to the calling program. Element 736 then operates to return a successful status indication to the calling program and returns the requested information as appropriate.

The flowcharts of FIG. 7 are intended only as general guidelines to aid in the understanding of the processing of several of the API functions listed and discussed below. Each API function discussed below includes a detailed description of its processing as applied to the data constructs discussed above.

API FUNCTIONS: RESOURCE INTEGRATION

As discussed above with respect to the processing of element 740 of FIG. 7, any change to the information base representing the topologies managed by the present invention causes the re-evaluation of the resource integration (as discussed above with reference to FIGS. 3–6). Some API functions directly affect the resource integration feature of the present invention. For example, API functions discussed below which supply an object to the topology service for topological management or to unmanage a previously managed object can directly affect the resource integration of the topologies affected.

When an object is initially supplied to the topology management service API, the resource integration is evaluated to determine whether the new object's addition to the topology causes the integration of previously distinct resources. The flowchart of FIG. 8 represents the processing which re-evaluates resource integration following the provision of an object to be managed by the topology management service API.

Figure 8:
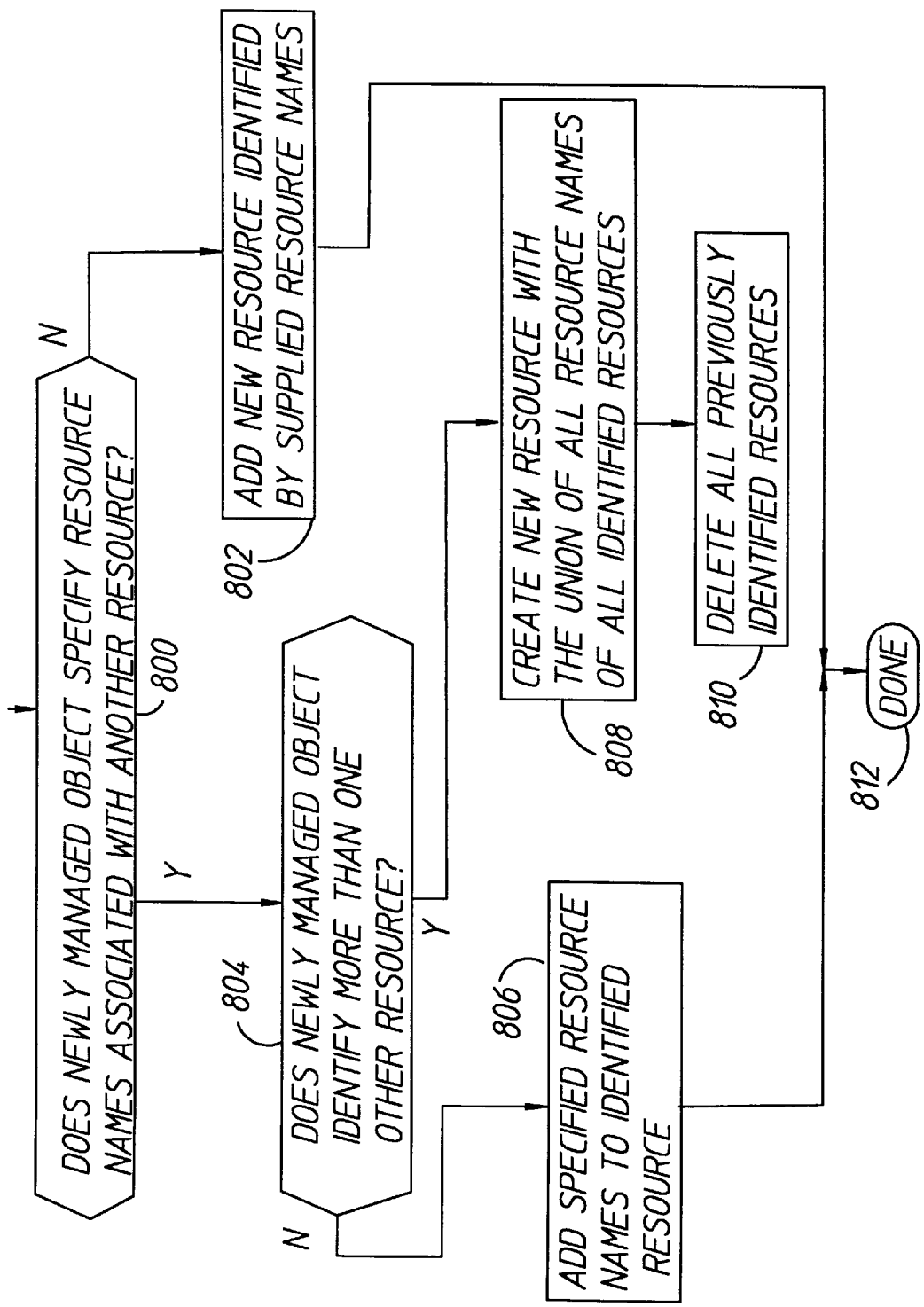
FIG. 8 is a flowchart of the methods of the present invention which operate to incorporate knowledge within the structures of the present invention of a newly managed object.

Processing in FIG. 8 begins at element 800 when an object is provided to the API to be managed under the topological management service of the present invention. Element 800 is operable to determine whether the newly managed object specifies resource names (RNs) which identify an already known resource. If not, then processing continue with element 802 to create a new resource uniquely identified by the resource names supplied in the newly managed object. The new resource is said to be represented by the newly managed object. Processing of the method is then complete and element 812 returns control to the caller of the resource integration function.

If the supplied, newly managed object does identify existing resources, then processing of element 804 determines whether it identifies one resource or multiple resources. If only one resource is identified by the newly managed objects, processing continues with element 806 wherein any resource names specified by the newly managed objects which were not previously known in the identified resource are added to the resource. In this manner, resources are said to grow by the possible addition of resource names which further identify the resource. Processing of the method is then complete and element 812 returns control to the caller of the resource integration function.

If the newly managed object identifies more than one resource, processing continues with element 808 and 810. Elements 808 and 810 operate to combine the identified resources into a new resource which is identified by the union of resource names of all objects representing the plurality of identified resources. The new resource is represented by the union of all objects (resource aspects—RAs) which previously represented the plurality of identified resources. The originally identified plurality of resources are then destroyed by operation of element 810 having been replaced by the new resource. Processing of the method is then complete and element 812 returns control to the caller of the resource integration function.

When an object is removed from the topology management service API, the resource integration is evaluated to determine whether the object's removal causes the disintegration of previously integrated resources. The flowchart of FIG. 9 represents the processing which re-evaluates resource integration following the removal of an object from the topology management service API.

Figure 9:
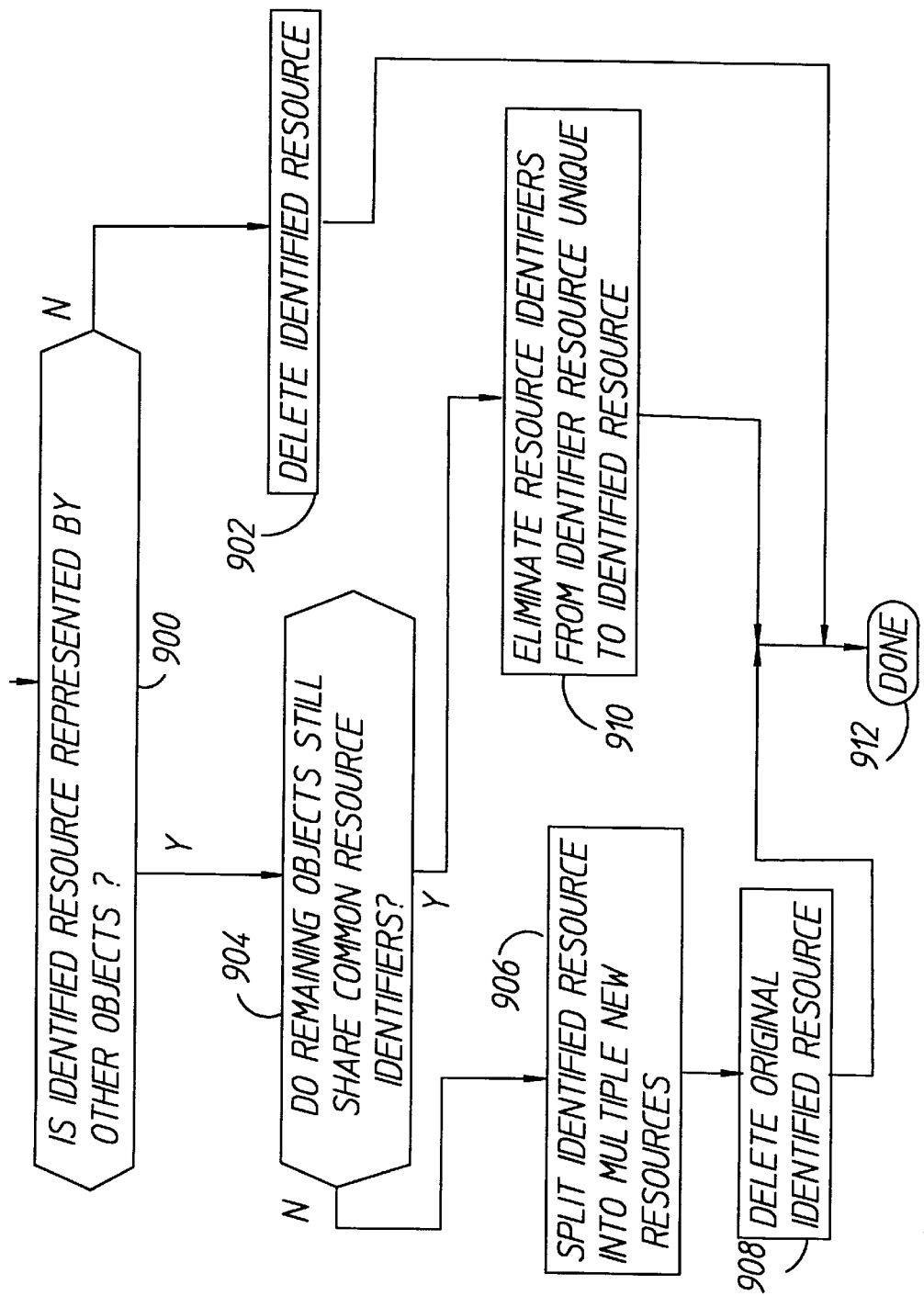
FIG. 9 is a flowchart of the methods of the present invention which operate to eliminate knowledge from the structures of the present invention of a previously managed object.

Processing in FIG. 9 begins at element 900 when an object is removed from the topological management service API of the present invention. The object to be removed contains resource names (RNs) which serve to identify a particular resource. Element 900 is operable to determine whether the identified resource is represented by other objects still managed under the topological management service API of the present invention. If the resource is no longer represented by any object under the API, then processing continue with element 902 to destroy the resource by removing it from the information base stored on disk 1 14. The resource is no longer known by the API topology management service since it is not represented by any object under the management service. Processing then continues with element 912, the complete processing of the method, and to return control to the calling function.

If the identified resource is still represented by one or more objects under the management of the topology management service API, then processing continues with element 904 to determines whether removal of the specified object changes the closure set of the identified resource. In other words, do the remaining objects which represent the resource still share at least one resource name (RN) with at least one other object which also represents the identified resource? If the resource name closure set is not changed, other than the removal of the specified object, then processing continues with element 910 to remove the resource names from the resource which are unique to the object specified to be removed. In this manner the resource is said to shrink by removal of resource names which previously were used to uniquely identify the resource. Processing then continues with element 912, the complete processing of the method, and to return control to the calling function.

If the processing of element 904 determines that the resource name closure set of the resource has changed, then processing continues with element 906 and 908 to split the identified resource into multiple new resources. Each new resource is represented by a resource name closure set of resource aspects (RAs) which previously were in the resource name closure set of the identified resource. Element 908 then continues processing by deleting the originally identified resource from the topology management service API permanent store on disk 114 of FIG. 1. The originally identified resource is no longer represented by any objects managed by the topology management service API. Processing then continues with element 912, the complete processing of the method, and to return control to the calling function.

Graphical examples of the operation of the resource integration methods of FIG. 8 and FIG. 9 are discussed above with respect to FIGS. 3–6. In addition, it will be noted that similar resource integration methods are utilized in conjunction with other methods (such as those generally described by the flowcharts of FIG. 7). The methods of FIG. 7 may, for example, change the set of resource names associate with a managed object, either adding or deleting resource names. Changes in the resource names stored in a managed object necessitate invocation of resource integration methods similar to those of FIGS. 8 and 9 without actually adding or removing an object from the topology management service API. Such modifications to the methods of FIGS. 8 and 9 will be readily apparent to those of ordinary skill in the computing arts.

API FUNCTIONS: DETAILED DESCRIPTIONS

The following descriptions provide details of the operation of each of the API functions available to the application programmer using the topology management service API of the present invention. The format of each description is as follows:

| | |
|---|---|
| FUNCTION TITLE - | Descriptive name of the function. |
| INTRODUCTION - | Introductory commentary (if any) where necessary to describe the purpose of the function. |
| INPUTS - | General description of parameters supplied by the calling application program. |
| PROCESSING - | Overview of the processing performed by the function. |
| OUTPUT - | General description of the output produced by the operation of the function. |

MANAGING RESOURCE ASPECT TYPES

This section describes the functions for managing resource aspect types (RATs). The functions include:

adding a new resource aspect type. This may be a specialization of one or more existing resource aspect types.

removing an existing resource aspect type.

Add a resource aspect type

Introduction

Resource aspect types are named and can be specializations of one or more existing resource aspect types.

Inputs

A request to add a resource aspect type—specifying:
  name of the resource aspect type
  a list of more general resource aspect types to specialize from (optional)

Processing

The function rejects a request to add a resource aspect type and generates an error if:
  the resource aspect type name is already known to the API
  a more general resource aspect type is specified in the request but it does not exist If the function accepts a request to add a resource aspect type, the function updates the resource aspect type store and returns the resource aspect type.

Outputs
  updated resource aspect type store
  resource aspect type
  error

Delete a resources aspect type

Inputs

A request to delete a resource aspect type—specifying:
  resource aspect type

Processing

The function rejects a request to delete a resource aspect type if:
  the resource aspect type does not exist
  an instance of the resource aspect type exists and that resource aspect is managed by the topology service
  the resource aspect type is a generalization of some other valid resource aspect type If the function accepts a request to delete a resource aspect type, the function removes the resource aspect type form the resource aspect type store.

If the function rejects a request to delete a resource aspect type, the function generates an error.

Outputs
  updated resource aspect type store
  error

Define the resource aspect rules for a resource aspect type

The developer can define rules for a resource aspect type. These specify the number and type of associations that a resource aspect of a given type must participate in. As one or more resource aspects represent a resource, one or more resource aspect rules describe the associations that a resource can participate in. A resource aspect whose resource aspect type is a specialization of a more general type must be a valid example of both the specialized type and the more general type. Resource aspect rules specified for the specialized resource aspect type therefore cannot overwrite rules specified for the more general type, instead they must be applied in addition to the more general rules.

Any resource aspect type will have a list of valid resource roles. For example:
  a "power connection" resource aspect type may have a "generator" resource role and a "consumer" resource role.
  a "computer" resource aspect type may have a "power consumer" resource role and a "contains extension card" resource role
  "ownership" resource aspect type may have a "owner" resource role and a "owned" resource role.

Each resource aspect rule includes a resource role. When the same resource role is used in a rule for one resource aspect type (say T) and also for another resource aspect type (say T'), if T' is a specialization of T then both rules apply to instances of type T'.

Inputs

A request to define the resource aspect rules for a resource aspect type—specifying:
  resource aspect type
  a list of resource aspect rules, a resource aspect rule consists of {resource role, resource aspect type, minimum cardinality, maximum cardinality, error} tuples Outputs
  updated resource aspect type store
  error

Operations of resource aspect rules

Introduction

Resource aspect rules express configurable invariants of a resource aspect type. They specify:
  what resource roles apply to the resource aspect type
  the number and types of associations that a resource of this resource aspect type must participate in
  the details of how specialization of resource aspect types affects resource aspect rules.

The way that the API allows the developer to specify configurable topology invariants using resource aspect rules provides direct support for the concept of resource aspect type specialization. In this context specialization of resource aspect types means that a particular resource aspect must be a valid representative of not just its resource aspect type but also all the generalizations of this type. This means that when the developer recognizes the inheritance relations between the resource aspect types that he uses to model his particular problem domain, the API allows the invariants to be expressed in a way that naturally reflects these inheritance relations. The API does this by taking the definitions of resource aspect rules that apply to a particular resource aspect type as only defining the additional rules for that resource aspect type. The rules defined for all generalizations of that resource aspect type do not need to be repeated but also apply.

For example, assume there is a resource aspect type X with the following resource aspect type rules:
  X supports resource role A according to rule R (where R expresses the resource aspect type and cardinality constraints)

X supports resource role B according to rule S

X supports resource role C according to rule T

Further, assume that resource aspect type X does not inherit from any other resource aspect type. Resource of type X can only participate in associations as follows:

- all associations must involve the resource in one of the resource roles A, B or C
- associations where the resource is in resource role A must comply with rule R
- associations where the resource is in resource role B must comply with rule S
- associations where the resource is in resource role C must comply with rule T Continuing from the previous example, this example demonstrates the use of specialization in resource aspect type definitions. Also assume there is a resource aspect type X' that is a specialization of X with the following resource aspect rules:

X' supports resource role B according to rule U

X' supports resource role C according to rule V

X' supports resource role D according to rule W

Resources of type X' can participate in associations as follows:

- all associations must involve the resource in one of the resource roles A, B, C or D
- associations where the resource is in resource role A must comply with rule R
- associations where the resource is in resource role B must comply with both rules S and U
- associations where the resource is in resource role C must comply with both rules T and V
- associations where the resource is in resource role D must comply with rule W Input resource aspect type store resource R Processing A resource R is valid if all the resource aspects that represent it are valid according to the following requirement. A resource aspect of resource aspect type T is valid according to the resource aspect rules if the following are both true:

the resource aspect only has associations where it is in the resource roles that are either specified for the resource aspect type T or specified for a more generalized resource aspect type each resource aspect associated with R has a resource aspect type T that conforms with all specifications for the relevant resource role for the resource aspect type T and for all generalizations of T the resource aspect is involved in the number of associations for each resource role that conforms with all specifications for the relevant resource role for the resource aspect type T and for all generalizations of T If a request made to the function is rejected as a result of a resource aspect rule, then the error associated with the resource aspect rule is returned and the associated resource aspect (that would have become invalid) is also returned.

Output error resource aspect associated with error

Define enforcers for a resource aspect type

Introduction

A topology enforcer is an object that supports an interface that implements a validity checker. The validity checker returns true or false when given a resource aspect of the specified type (including sub-type) to check. The API enforcers allow the developer to specify constraints that can't be expressed using the resource aspect rules. For example, assume a developer has defined resource aspect types "computer", "modem" and "provides dial-up services". Assume that a resource of type "provides dial-up services" must have one association with a "computer" and one with a "modem". These constraints are expressible using resource aspect rules. Consider now the constraint that any associations between "computers" and "provides dial-up services" and between "modems" and "provides dial-up services" cannot be formed unless the baud rate is the same for the "computer" and for the "modem". This constraint cannot be expressed (given the particular way that the developer has modelled this problem) using resource aspect rules and therefore requires an enforcer.

The API enforcers constrain all resource aspects of a specified resource aspect type (and specializations of it). Associated with each API enforcer is a trigger condition. The trigger condition specifies the conditions under which the API will invoke the enforcer. Trigger conditions include changes to topological and non-topological characteristics. Trigger conditions can only be "local" changes. By "local" it is meant that an API enforcer for a resource aspect type (say T) will only be invoked for changes to a resource having resource aspect type T or for changes to a resource that is directly associated with a resource having resource aspect type T.

Inputs

A request to define the API enforcers for a resource aspect type—specifying:

resource aspect type (say T)

a list of API enforcers each with an associated trigger condition, that is one or more of the following:

1) an association is formed that involves a resource aspect of type T
2) an association is deleted that involves a resource aspect of type T
3) a (non-topological) state change occurred to a resource aspect of type T
4) a resource aspect formerly of type T changes resource aspect type
5) an association is formed that involves a resource represented by a resource aspect of type T
6) an association is deleted that involves a resource represented by a resource aspect of type T
7) a (non-topological) state change occurred to some resource aspect that represents a resource also represented by a resource aspect of type T
8) some resource aspect, that represents a resource also represented by a resource aspect of type T, changes resource aspect type
9) as in 1 to 8 above except that the change occurred to an associate of a resource aspect of type T
10) as in 1 to 8 above except the change occurred to an associate of a resource aspect that represents a resource that is also represented by a resource aspect of type T Processing
The function rejects a request to define the API enforcers for a resource aspect type and generates an error if:
  the resource aspect type is not known to The API
  there are already API enforcers defined for the resource aspect type
  an invalid trigger condition is specified
If the function accepts a request to define the API enforcers for a resource aspect type, the function updates the resource aspect type store.
Outputs
  updated resource aspect type store
  error Operation of API enforcers Input
  resource aspect R of resource aspect type T
  list of API enforcers
Processing
  The function invokes the "validate" method with argument R, on all API enforcers for resource aspect type T and all API enforcers for generalizations of resource aspect type T, whenever a request (or batch of requests) to modify the topology information storage base is made that corresponds to the trigger condition for that enforcer.
  A resource aspect is valid according to an enforcer if the enforcer returns a true result when called by the API. If the enforcer returns an error, then the function returns that error, together with the resource aspect that would have become invalid, to the user that requested the topology change, and rejects the change. If no valid response from an enforcer is received by the function, then the function informs the user that requested the topology change, and rejects the change.
Output
  error
  resource aspect associated with error Define topology change notification receivers for a resource aspect type Introduction
  A topology notification receiver is an object that supports an interface that receives a notification of a change in the API.
Inputs
A request to register for notification of change for a resource aspect type—specifying:
  resource aspect type (say T)
  a host to act as a filter (optional)
  a list of notification receivers each with an associated trigger condition, that is on or more of the following:
    1) an association is formed that involves a resource aspect of type T
    2) an association is deleted that involves a resource aspect of type T
    3) a (non-topological) state change occurred to a resource aspect of type T
    4) a resource aspect formerly of type T changes resource aspect type
    5) an association is formed that involves a resource represented by a resource aspect of type T
    6) an association is deleted that involves a resource represented by a resource aspect of type T
    7) a (non-topological) state change occurred to some resource aspect that represents a resource also represented by a resource aspect of type T
    8) some resource aspect, that represents a resource also represented by a resource aspect of type T, changes resource aspect type
    9) as in 1 to 8 above except that the change occurred to an associate of a resource aspect of type T
    10) as in 1 to 8 above except the change occurred to an associate of a resource aspect that represents a resource that is also represented by a resource aspect of type T
Processing
The function rejects a request to define topology change notification receivers for a resource aspect type and generates an error if:
  the resource aspect type is not known to the function
  there are already notification receivers defined for the resource aspect type
  an invalid trigger condition is specified
If the function accepts a request to define topology change notification receivers for a resource aspect type, the function updates the resource aspect type store.
Outputs
  updated resource aspect type store
  error Register topology change notification receivers for a resource aspect Introduction
  A topology notification receiver is an object that supports an interface that receives a notification of a change in the API.
Inputs
A request to register for notification of change for a resource aspect—specifying:
  resource aspect say RA
  a list of notification receivers each with an associated trigger condition, that is one or more of the following:
    1) an association is formed that involves resource aspect RA
    2) an association is deleted that involves a resource aspect RA
    3) a (non-topological) state change occurred to a resource aspect RA
    4) resource aspect RA changes resource aspect type
    5) an association is formed that involves a resource represented by resource aspect RA
    6) an association is deleted that involves a resource represented by resource aspect RA
    7) a (non-topological) state change occurred to some resource aspect that represents a resource also represented by resource aspect RA
    8) some resource aspect, that represents a resource also represented by resource aspect RA, changes resource aspect type
    9) as in 1 to 8 above except that the change occurred to an associate of resource aspect RA
    10) as in 1 to 8 above except the change occurred to an associate of a resource aspect that represents a resource that is also represented by resource aspect RA
Processing
The function rejects a request to register topology change notification receivers for a resource aspect and generates an error if:
  the resource aspect is not known to the function
  an invalid trigger condition is specified
If the function accepts a request to register topology change notification receivers for a resource aspect, the function updates the API stored information base.

Outputs
  updated stored topological information base
  error

De-register Topology Change Notification Receivers for a Resource Aspect

Introduction

A topology notification receiver is an object that supports an interface that receives a notification of a change in the API.

Inputs
  A request to de-register for notification of change for a resource aspect—specifying:
    resource aspect say RA
    a list of notification receivers to de-registered Processing
The function rejects a request to de-register topology change notification receivers for a resource aspect and generates an error if:
  the resource aspect is not known to the function
  an invalid trigger condition is specified
If the function accepts a request to de-register topology change notification receivers for a resource aspect, the function updates the API topological stored information base (if the receivers were registered).

Outputs
  updated topological stored information base
  error

Topology notification processing

Input
  resource aspect RA of resource aspect type T
  list of topology change notification receivers Processing
The function invokes the "receive notification" method with argument RA on all topology change notification receivers registered for resource aspect RA and for all defined for resource aspect type T or for generalizations of resource aspect type T, whenever a change that corresponds to the trigger condition for that receiver is made to the topology information base. If the topology change notification receiver was defined using the optional host filter, then the function only invokes the receiver if the change occurred on the specified host.

Output
  receivers are notified

Querying resource aspect types

Introduction

These queries return the data that the API associates with a resource aspect type. The queries apply to either an individual resource aspect type, or the resource aspect type name space.

Inputs
  A request to find a resource aspect type by name—specifying:
    resource aspect type name Processing
The function indicates whether or not the resource aspect type name is known. If known, the function supplies the resource aspect type that corresponds to the resource aspect type name.

Outputs
  whether or not the resource aspect type name is known
  resource aspect type

Query resource aspect type

Introduction
This query returns the details of a resource aspect type.

Inputs
A request to determine the details of a resource aspect type—specifying:
  resource aspect type Processing
The function generates an error if the resource aspect type does not exist. If not rejected, the function supplies the following data about the resource aspect type:
  name of the resource aspect type
  list of more general resource aspect types (immediate parents)
  list of user (i.e. developer) supplied topology enforcers (see "Define enforcers for a resource aspect type" supra)
  list of user (i.e. developer) supplied topology notification receivers (see "Define topology change notification receivers for a resource aspect type" supra)
  list of resource aspect rules (see "Define the resource aspect rules for a resource aspect type" supra)

Outputs
  name of the resource aspect type
  list of more general resource aspect types
  list of user supplied topology enforcer objects
  list of user supplied topology notification receiver objects
  list of resource aspect rules
  error

Query resource aspect type inheritance

Introduction
This query returns true if resource aspect type (A) is an ancestor of resource aspect type (B). This query is used for determining if B 'is-a' A.

Inputs
A request to determine if resource aspect type B inherits from resource aspect type A, specifying:
  resource aspect type A
  resource aspect type B Processing
The function returns True if resource aspect type B is a descendent of resource aspect type A in the resource aspect type inheritance hierarchy. The function returns False if resource aspect type B is not a descendent of resource aspect type A.

Outputs
  boolean True or False, but not both.

MANAGING RESOURCES

A resource is the model that the API produces of the combined characteristics of a thing of interest, A resource aspect is the model of a set of those characteristics that relate to a particular "aspect" of the thing. Typically resource aspects model the thing from the viewpoint of one application program whereas a resource models the combination of all such viewpoints. Each resource aspect is said to represent the resource that it models a view of.

A resource aspect is the fundamental unit in the topology management API that:
  has its topological characteristics managed by the API
  supports transactions, and locking
  supports security
  supports naming
The "manage a resource aspect" function is the means by which an object is related to a resource aspect type to thereby become a resource aspect available to the API. The object provided to the API may contain other non-topological aspects which are not managed by the API other than to be stored with the object as it is managed within the API as a resource aspect. When a resource aspect is managed, the API topology management service maintains the additional state that is acquired by the resource aspect. This state is contained within the "topological component" of the resource aspect, links are maintained between the "topological components" and the "non-topological components."

Resource aspects may be named by resource names. Resource names are one method used by the API service to indicate when two or more resource aspects represent the same resource. As a result of adding and removing resource names from resource aspects, resources may cease to exist and new resources may be created. If direct references to resources were held by applications, these references would become "stale" as a result. For this reason resources are only referenced indirectly (outside of the API service itself) via the resource aspects that represent them. Therefore there can be no stale references to resources that no longer exist.

Manage a resource aspect

Introduction
  A request to manage a resource aspect by the API service.
Inputs
A request to manage a resource aspect by the API—specifying:
  an object
  resource aspect type
  list of resource names (optional)
Processing
The function rejects a request to manage a resource aspect and generates an error if any of the following are true:
  the resource aspect does not exist If accepted, the function updates the topological stored information base and returns the resource that the specified resource aspect represents. The function determines the resource, that is represented by the resource aspect specified in the input request, by processing that is functionally equivalent to the following:
  create new unnamed resource represented only by the input resource aspect
  add each resource name in the input request to the resource aspect as described in "Add a resource name to a resource aspect" below (this may or may not cause existing resources to be combined)
Outputs
  an updated topological stored information base
  a resource
  error

Unmanage a resource aspect

Introduction
  A request to unmanage a resource aspect by the API service. If the resource is only represented by the single resource aspect being unmanaged then the resource will cease to exist. If the resource is represented by other resource aspect as well then either:
  the resource looses the characteristics represented by the resource aspect, in effect "shrinking" the resource
  the resource splits into two new resources and the original resource ceases to exist
As discussed earlier, FIG. 4 illustrates the change that would result by requesting that the API unmanage RA3 410. In this case RESOURCE1 402 splits forming two new resources (RESOURCE3 and RESOURCE4). Had the request been to unmanage RA4 instead of RA3 then the effect would be to simply "shrink" RESOURCE1.
Inputs
A request to unmanage a resource aspect—specifying:
  resource aspect
Processing
The function rejects a request to unmanage a resource aspect and generates an error if any of the following are true:
  the input does not specify a valid resource aspect
  the resource aspect is involved in any associations managed by the API service
  the requirements of "Topology invariants" discussed above are not met.
If accepted, the function dissociates this resource aspect from all resource names. It ceases to be a resource aspect and does not represent any resource.
Outputs
  updated topological stored information base
  error

Add a Resource Name to a Resource Aspect

Introduction
  This describes the processing required to add a name to the list of resource names by which a resource aspect is known. If the new resource name provided also identifies another existing resource then the two existing resources merge to form a new combined resource.
  As discussed above, FIG. 5 illustrates the change that would result by adding a new resource name to resource aspect RA8 518. In this case the new name is shared by RA4 512. RESOURCE1 and RESOURCE2 merge to form RESOURCE3, RESOURCE1 and RESOURCE2 cease to exist.
Inputs
A request to add a resource name to a resource aspect—specifying:
  resource aspect
  resource name
Processing
The function rejects a request to add a resource name to a resource aspect and generates an error if any of the following are true:
  the resource aspect does not exist
  the requirements of "Topology invariants" discussed above are not met
If accepted, the function associates the resource name with the resource aspect. Two resources may merge to form a new resource as a result.
Output
  updated topological stored information base

Remove a Resource Name from a Resource Aspect

Introduction
  This describes the processing required to remove a name from the list of resource names by which a resource aspect is known. If the resource name to be removed also identifies another existing resource aspect then the existing resource may split (whether or not it splits depends on the new resource name closure group).
  As discussed above, FIG. 6 illustrates the change that would result by removing a resource name from resource aspect RA8 612. In this case the name was only shared by RA4 610. RESOURCE1 splits to form RESOURCE2 and RESOURCE3, RESOURCE1 ceases to exist.

Inputs
A request to remove a resource name from a resource aspect—specifying:
   resource aspect
   resource name
Processing
The function rejects a request to remove a resource name from a resource aspect and generates an error if any of the following are true:
   the resource aspect does not exist
   the resource aspect is not associated with the resource name
   the requirements of "Topology invariants" discussed above are not met
If accepted, the function dissociates the resource name from the resource aspect. A resource may split to form two new resources as a result.
Outputs
   updated topological stored information base
   error

Update the Resource Aspect Type of a Resource Aspect

Introduction
   This API is used to change the resource aspect type of an existing resource aspect.
Inputs
A request to update the resource aspect type of a resource aspect—specifying:
   new resource aspect type
   resource aspect
Processing
The function rejects a request to change the resource aspect type of a resource aspect and generates an error if any of the following are true:
   the resource aspect type does not exist
   the resource aspect is invalid
   the requirements of "Topology invariants" discussed above are not met
If accepted, the function changes the resource aspect type of the resource aspect. All resource aspects retain all associations managed by the API service that they had prior to the request to update.
Outputs
   updated topological stored information base
   error

Explicitly Combine two Resources via two Resource Aspects

Introduction
   This describes the processing required to explicitly combine two resources. This operation is functionally equivalent to generating a unique resource name (not shared by any other resource aspects) and adding the generated name to the list of names for each of two resource aspects. As a result two resources will merge into a single resource, unless both resource aspects already represent the same resource.
Inputs
A request to combine two resources specifying:
   two resource aspects
Processing
The function rejects a request to combine two resources and generates an error if any of the following are true:
   either resource aspect does not exist
   the requirements of "Topology invariants" discussed above are not met
If accepted, the function ensures that the two resource aspects always represent the same resource.
Outputs
   updated topological stored information base

Undo an Explicit Combination of two Resources via Two Resource Aspects

Introduction
   This describes the processing required to unconstrain two resource aspects from having to represent the same resource. This operation is functionally equivalent to removing from each resource aspect the API generated resource name used to ensure that the two resource aspects represented the same resource. As a result of this operation, the resource that the two resource aspects represented will split into two resources, unless the resource aspects are also part of the same resource name closure group.
Inputs
A request to unconstrain two resource aspects from having to represent the same resource specifying:
   two resource aspects
Processing
The function rejects a request to unconstrain two resource aspects from having to represent the same resource and generates an error if any of the following are true:
   either resource aspect does not exist
   the requirements of "Topology invariants" discussed above are not met
If accepted, the function removes the constraint that the resource aspects always represent the same resource.
Outputs
   updated topological stored information base
   error

Querying Resources

Introduction
   This section specifies the queries provided for examining the relations between resource aspects and the resources that they represent. It does not include queries about the associations between resources nor resource attribute based queries. These types of queries are described in "General topology query" below. The following types of query are supported,
   query of individual resources
   query of individual resource aspects
   query of the total resource name space to identify individual resources or resource aspects

Query of Individual Resource Data

Introduction
   The queries specified in this section apply to data about a resource (i.e. the aggregated view as defined through resource aspects). The resource that is being queried is identified by specifying any one of the resource aspects that represent it. The query result may be filtered so that it only contains information pertaining to a limited set of the resource aspects that represent the resource. The filter is specified by:
   a resource aspect type, in which case the result will be limited to that supported by the resource aspect of that type
   a resource name, in which case the result will be limited to that supported by the resource aspects named by that name
The output from the query will be the resource names, resource aspect types and resource aspects that the nominated resource supports, subject to the filter.

Inputs
resource
optional resource aspect type
optional name
Processing
The function rejects this request if any of the following occur:
the resource is not a valid resource
a resource aspect type is input, but does not exist.
a resource name is input, but does not exist.
If a resource aspect type is input, then the function limits the output data to that supported by the resource aspect of the input resource aspect type. If a resource name is input, then the function limits the output data to that supported by the resource aspects which are named by the input resource name. The function outputs the following data:
the resource's resource aspect types
the resource's resource aspects
the resource's resource names
Outputs
list of resource aspect types
list of resource aspects
list of resource names

Query of Individual Resource Aspect Data
Introduction
The queries specified in this section apply to a particular resource aspect. Other resource aspects representing the resource are not involved. The output from the query will be the resource names and the resource aspect type of the resource aspect.
Inputs
resource aspect
Processing
The function rejects this request if any of the following occur:
the resource aspect is not valid If the resource aspect is valid, the function outputs the following data:
the resource aspects' resource aspect type
the resource aspects' resource names.
Outputs
error
the resource aspect type
list of resource names

Query of Resource Name Space
Introduction
The queries specified in this section apply to all resource aspects. The output from the query will be the resources which are identified by the resource names.
Inputs
lit of resource names
Processing
The function outputs the resources that have any name in the input resource name list.
Outputs
list of resources

Query a Resource Aspect for Explicitly Combined Resource Aspects
InPuts
A request to query a resource aspect for explicitly combined resource aspects specifying:
a resource aspect Processing
The function rejects the request if
the resource aspect does not exist
If accepted, the function either returns a list of other resource aspects that have been explicitly combined with this resource aspect or returns an indication that no resource aspects have been explicitly combined with this resource aspect.
Outputs
list of resources aspects explicitly combined with the given resource aspect
indication of no explicitly combined resource aspects

MANAGING ASSOCIATIONS

Creating an Association
Introduction
Associations are established between resources. Specifically they are established between particular resource aspects.
Inputs
A request to establish an association between resources—specifying:
two {resource aspect, resource role} pairs
Processing
The function rejects a request to establish an association and generates an error if any of the following are true:
either resource aspect does not exist
a resource aspect does not support the specified resource role
the requirements of "Topology invariants" discussed above are not met
If the function accepts the request, the function stores the association. If a resource role has a cardinality greater than one, then the function associates a unique index with each resource role so that they can be distinguished.
Outputs
updated resource store
error

Delete an Association
Introduction
The function allows an association to be removed if no other resource will be affected.
Inputs
A request to delete an association between resources—specifying:
two {resource aspect, resource role} pairs, where an index may optionally be specified for a resource role
Processing
The function rejects a request to delete an association and generates an error if any of the following are true:
either resource aspect does not exist
a resource aspect does not support the specified resource role
the requirements of "Topology invariants" discussed above are not met If the function accepts the request, the function deletes the association.
Outputs
updated topological stored information base
error

Querying Associations
Introduction
This section specifies the queries provided for examining individual associations. It does not include general queries about the associations between resources nor resource attribute based queries. These types of queries are described in "General topology query" below.

Query Associations for a Resource Aspect

Inputs

A request to list all the associations for a resource aspect—specifying:
resource aspect Processing The function generates an error if the resource aspect does not exist. If not rejected, the function supplies for the resource aspect the following data for each association that this resource aspect participates in:
resource role and index for this resource aspect
resource role and index, and resource aspect for the associated resource aspect Outputs For each association:
resource role and index for this resource aspect
resource role and index, and resource aspect for the associated resource aspect
error

GENERAL TOPOLOGY QUERY

Introduction

The support for general topology queries consists of a Topology Query (TQ) API defined below. The TQ API provides a programming interface for the expression of general topology queries. One of ordinary skill in the art will recognize that a topology query language may be implemented utilizing the topology query API to simplify ad-hoc inquiry of the topology management service API.

The API supports general topology queries on the set of all defined resources. Each query specifies one or more "meta-resources" that are matched against the known resources. A meta-resource is essentially a template for matching resources. Navigation queries are expressed as navigation paths that must be matched against paths through the topological stored information base. Navigation paths can be combined with logical operators to form compound propositional expressions on topology. In addition, repetition statements can be placed on navigation paths, or parts of navigation paths, to indicate an optional repetition of resources in topology paths.

The result of a topology query consists of two parts. The first part is a boolean value that indicates whether the propositional expression, posed by the query, evaluates to true or false. This part of the result is always returned. The second part of the result is a sub-graph, or sub-graphs, that match the navigation paths specified by the query. The construction and existence of this part of the result is dependent on:
result construction rules
show indicator rules Topological Store Information Base The topological stored information base can be viewed as a graph of associated resources. A topology graph is a set of nodes and a set of edges connecting the nodes. Nodes are resources, and edges simply indicate the existence of an association between the two resources.

Meta-Resource Templates

A meta-resource is a template for matching resources in topology. A meta-resource can be:
a specific resource in topology
'any' resource in topology
a resource aspect type
a propositional expression of resource aspect types. The propositional expression can be formed using the logical connectives AND, OR and NOT. For example, a meta-resource may specify (Type-A AND Type-B) AND NOT Type-C.

A meta-resource can optionally also express a propositional expression on resource attribute values. The propositional expression can be formed from one or more value assertions linked using the logical connectives AND, OR and NOT. For example, a meta-resource may specify (Attribute-A=25 AND Attribute-B<50) AND NOT Attribute-C="string".

The meta-resources, logical connectives and their associations form a tree. In this tree branches can only occur at the AND and OR logical connectives. Therefore meta-resource nodes have at most two associations with other meta-resource nodes:
at most one predecessor association, and
at most one successor association An association in the query tree means that an association in the topological stored information base must be traversed.

A meta-resource can optionally specify a resource role for the associations it is involved in. If specified these resource roles limit the resources that match the meta-resource to those that take the specified role in the corresponding association. The specification for a resource role may include an index. A meta-resource can also specify a filter. A filter is a user defined method which is applied to all resources that match the meta-resource. A filter is a boolean expression that returns true or false. If a filter is specified the filter must return true for the resource to be considered as a match.

Type Matching

Figure 14:
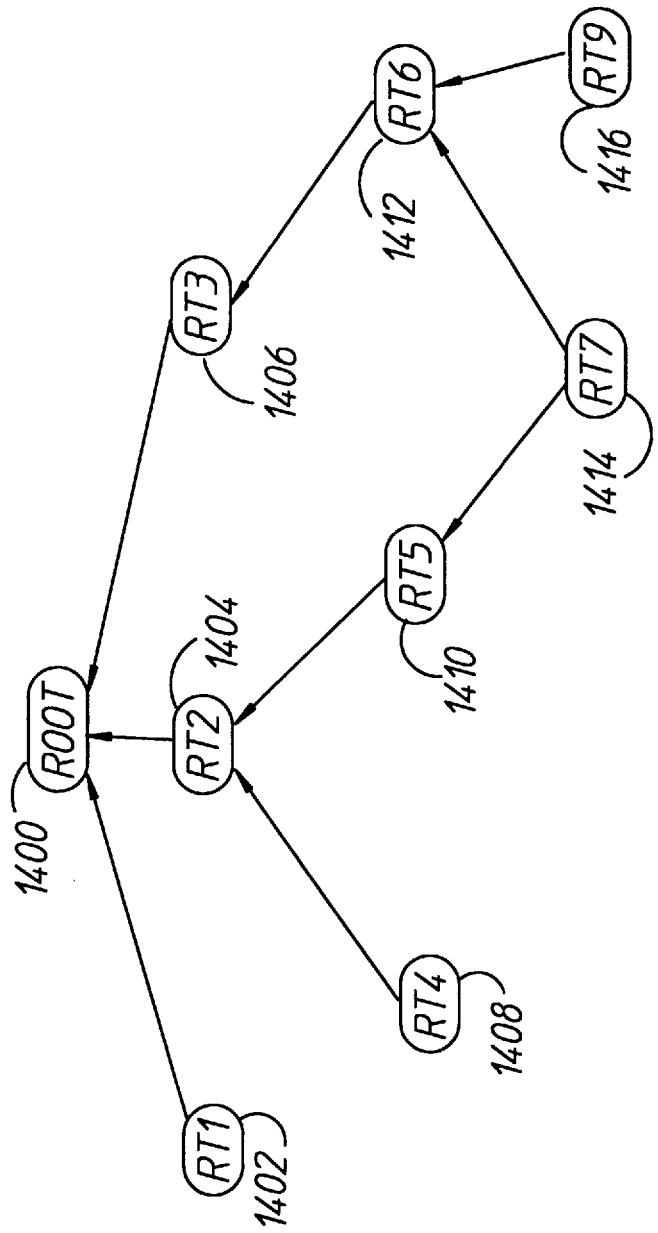
FIG. 14 depicts the hierarchy of exemplary inherited resource aspect type data constructs of the present invention.

Resource aspect types are organized into inheritance type hierarchies. A resource aspect is matched against a resource aspect type if:
it has the same resource aspect type as that specified, or
it has a resource aspect type that is a specialization of that specified For example, FIG. 14 depicts a tree of resources aspect types. If a meta-resource specifies resource aspect type RT3 1406, all resources with resource aspect type RT3 1406, RT6 1412, RT7 1414, and RT9 1416 will match the meta-resource. Resource aspect types ROOT 1400, RT1 1402, RT2 1404 RT4 1408, and RT5 1410 will not match the meta-resource.

Navigation Paths

Figure 15:
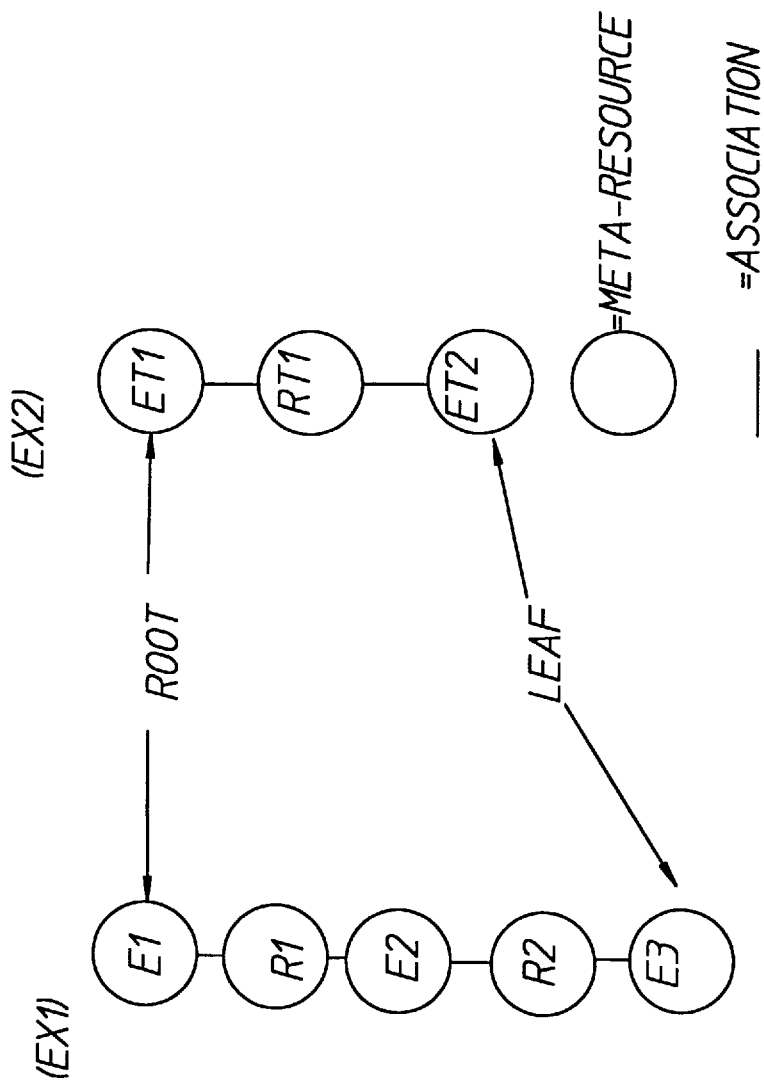
FIG. 15 depicts graphical representations of general topology queries relating to topological associations in the topological stored information base exemplifying simple navigation paths.

A simple navigation path contains one or more meta-resources. A simple navigation path can be viewed as a proposition on topology that will return true or false, but not both. Each topology query must consist of at least one simple navigation path. A simple navigation path is a "recipe" for matching paths through the topological stored information base. A path in topology will match a simple navigation path if each resource in the topology path matches the corresponding meta-resource in the navigation path. Each simple navigation path has a root meta-resource and a leaf meta-resource. Resource matching starts with the root meta-resource and progresses sequentially to the leaf meta-resource. Several paths through topology may match a simple navigation path. Some examples of simple topology queries using a simple navigation path in FIG. 15 may be described as follows:

Ex1: Is resource E1 associated via resource R1 with resource E2, where resource E2 is also associated via resource R2 with resource E3?

Ex2: Is there any resource of resource aspect type matching ET1, associated via a resource that matches RT1, with a resource of resource aspect type that matches ET2?

Both example queries start resource matching at the root meta-resource of their simple navigation paths, namely E1 in Ex1 and ET1 in Ex2. Ex1 will only find, at most, one matching path in topology as it specifies a specific resource at every meta-resource. Ex2 may find several paths in topology that match the root meta-resource as it specifies resource aspect types at every meta-resource. A query will return true if it can find at least one matching path in topology.

Compound Statements

Simple navigation paths can be combined, using logical connectives, to pose more advanced queries on the topology graph structure. The logical AND, OR and NOT connectives are used to produce compound propositional expressions on topology. Evaluation of the connectives is in accordance with the rules of logic. These are:

Logical NOT: The negation of a true result is false, whereas the negation of a false result is true.

Logical AND: The conjunction of two results is true if both component results are true.

Logical OR: The disjunction of two results is true if at least one of the component results is true.

The logical connectives extend simple and complex navigation paths at their leaf nodes by adding additional navigation paths forming more complex navigation paths. Complex navigation paths are paths within query trees. A navigation path is a path in the query tree where the root node of the navigation path is any node in the query tree.

Figure 16:
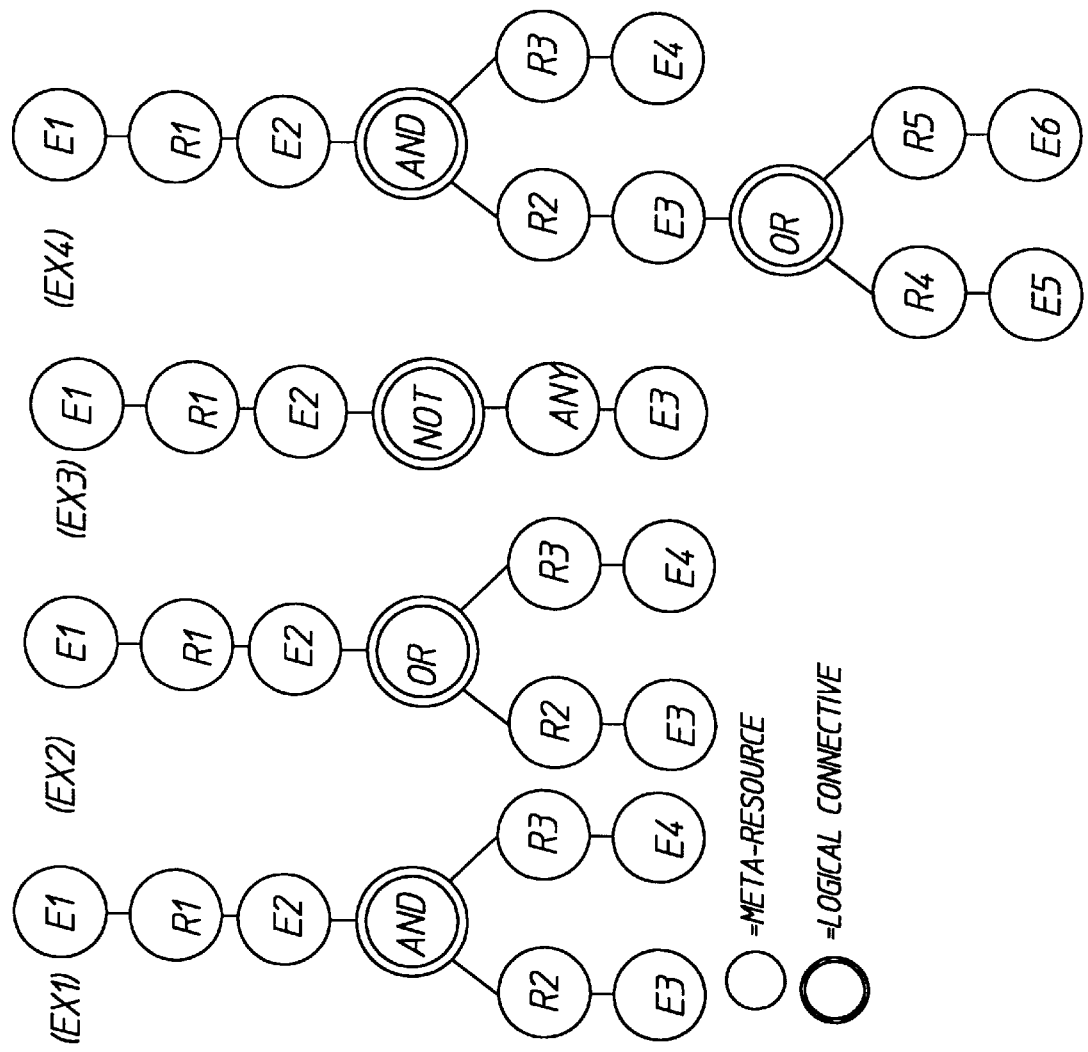
FIG. 16 depicts graphical representations of general topology queries relating to topological associations in the topological stored information base exemplifying compound statements in a query.

Some examples of topology queries using the logical connectives depicted graphically in FIG. 16 may be described as follows:

Ex1: Is resource E1 associated, via resource R1, with resource E2, where E2 is associated, via resource R2, with resource E3 AND where E2 is also associated, via resource R3, with resource E4?

Ex2: Is resource E1 associated, via resource R1, with resource E2, where E2 is associated, via resource R2, with resource E3 OR where E2 is associated, via resource R3, with resource E4?

Ex3: Is Resource E1 associated, via resource R1, with resource E2, where E2 is NOT associated, via any resource, with resource E3?

Ex4: Is resource E1 associated, via resource R1, with resource E2, where E2 is associated, via resource R2, with resource E3, AND where E2 is also associated, via resource R3, with resource E4, and where resource E3 is associated, via resource R4, with resource E5, OR where resource E3 is associated, via resource R5, with resource E6.

These examples show that the queries that can be posed to the API can be complex (and difficult to unambiguously describe in a natural language).

All four queries start resource matching at the root meta-resource (E1). Queries Ex1 and Ex2 contains two complex navigation paths rooted at E1, whereas query Ex3 contains a single navigation path rooted at E1. Query Ex4 shows an example of nested logical connectives, with a total of three complex navigation paths that are rooted at E1.

Ex1 will only return true if there is at least one path through topology from E1 to E2 (via R1), and from E2 to both E3 (via R2) AND E4 (via R3).

Ex2 will only return true if there is at least one path through topology from E1 to E2 (via R1), and from E2 to either E3 (via R2 OR E4 (via R3).

Ex3 will only return true if there is at least one path through topology from E1 to E2 (via R1), and there is no path from E2 to E3 (via any resource).

Ex4 will only return true if there is at least one path through topology from E1 to E2 (via R1), and from E2 to both E3 (via R2) AND E4 (via R3), and from E3 to either E5 (via R4) OR E6 (via R5).

Compound Queries

Figure 17:
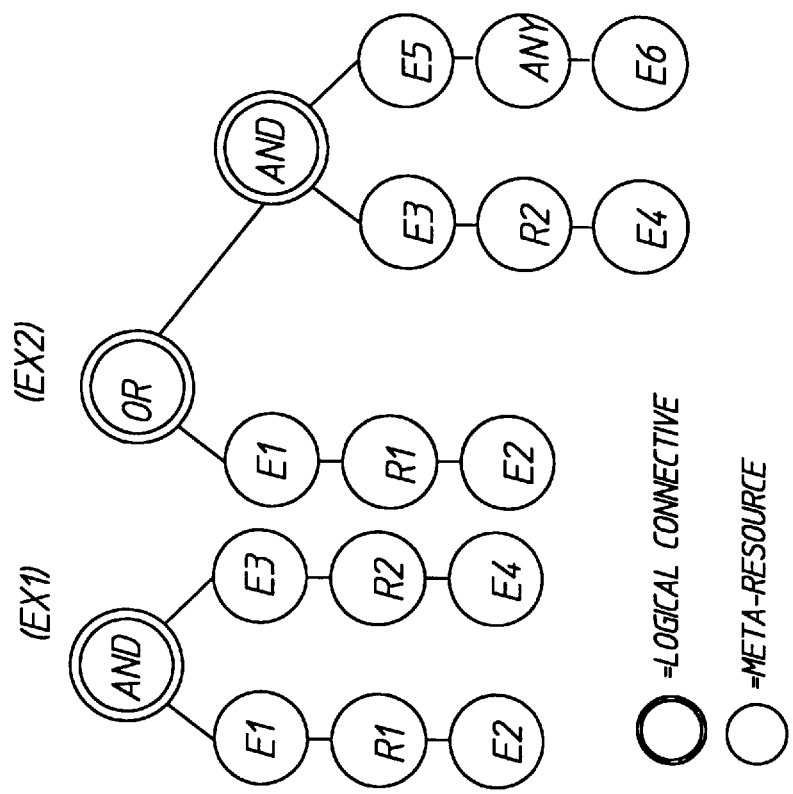
FIG. 17 depicts graphical representations of general topology queries relating to topological associations in the topological stored information base exemplifying compound queries.

The logical connective can be used to express compound queries on topology. A compound query combines the result of two or more queries to produce a single result. The logical AND and OR connectives are used to express compound queries. Examples of compound queries are depicted in FIG. 17 and may be described as follows:

Ex1: Is resource E1 associated, via resource R1, to resource E2, AND is resource E3 associated, via resource R2, to resource E4?

Ex2: Is resource E1 associated, via resource R1, to resource E2 OR (is resource E3 associated, via resource R2, to resource E4 AND is resource E5 associated, via any resource, to resource E6)?

Repetition

Figure 18:
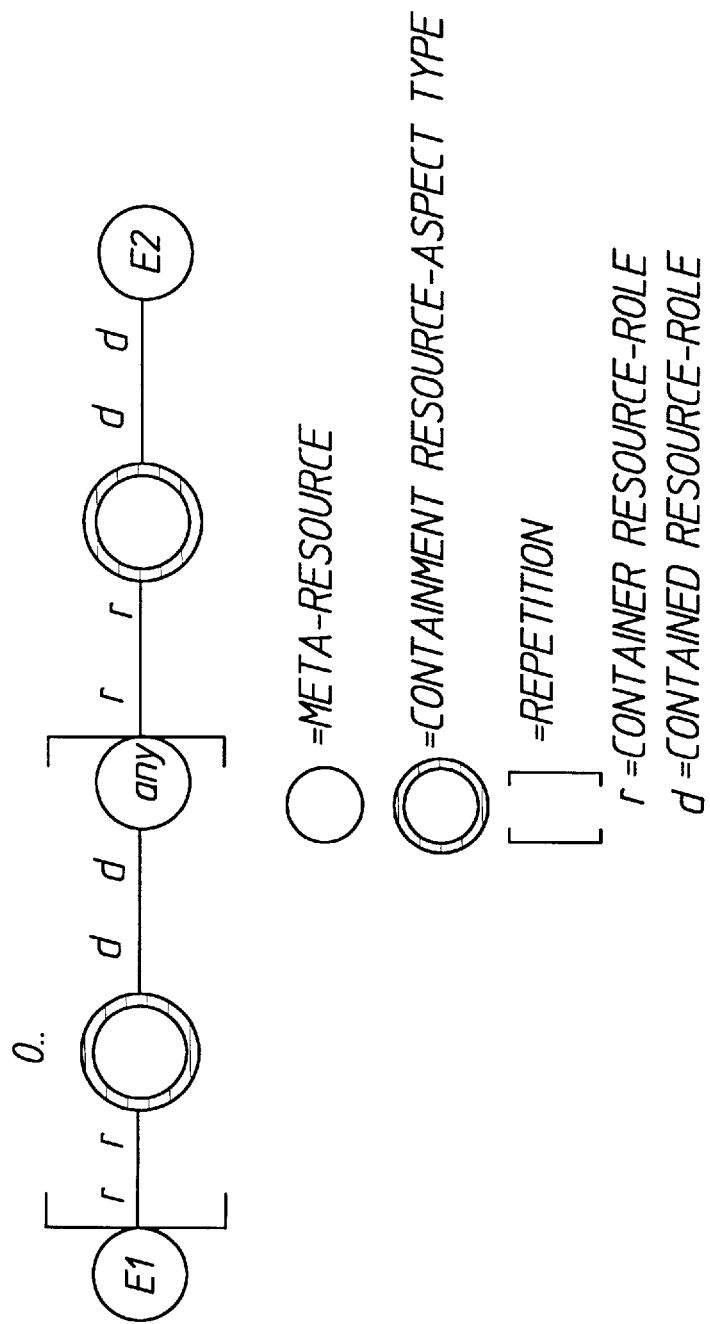
FIG. 18 depicts graphical representations of general topology queries relating to topological associations in the topological stored information base exemplifying repetition in queries.

A simple navigation path or a part of a simple navigation path, can be repeated a number of times as part of the query. A repetition statement is bounded by a lower limit. An optional upper limit may also be specified. These limits indicate the minimum and maximum number of times the repetition can occur in a topology path. An example of specifying repetition in a query is depicted graphically in FIG. 18 and may be described as follows:

Is resource E2 contained within resource E1, where we understand containment to be transitive, i.e. if E1 contains X and X contains Y then? E1 contains Y. This example also shows how resource roles, specified for each meta-resource per association, are used. In the example a resource aspect type "containment" is used. This type supports two roles, "container" and "contained". The other resources also support these roles.

Resource Matching Constraint

Typically the query user will want to express a constraint that any resource is to only match one meta-resource in the query. This will be taken as the default. This default can be overridden so that the user can alternatively specify the following resource matching constraints. These constraints are specified for any pair of meta-resources:

Equals: a resource that matches a specified meta-resource must also match another specified meta-resource in the query Don't care: a resource that matches one specified meta-resource may or may not match another specified meta-resource in the query Query Result There are two parts to a query result.

A boolean result which will return true or false, but not both. This part of the result is always returned and is an evaluation of the propositional expression posed on topology.

Sub-graphs of topology that match the navigation paths specified by the query. This part of the result is optional and is dependent on the combination of result construction rules and show indicator rules.

Result Construction Rules

The result construction rules specify the number of sub-graphs to be returned from a query. A query can only return sub-graphs if the boolean result of the query was true. There are four result construction rules:

None: This rule specifies that the query will not return any sub-graphs in the result. The boolean value is the only result returned.

Any: Returns one sub-graph. The query will return the result of one successful match made on topology.

List: Returns one or many sub-graphs. The query will return the results of all successful matches made on topology.

Graph: Returns one sub-graph. The query combines the results of all successful matches made on topology and removes all duplicate resources.

A query can only specify one result construction rule at a time.

Show Indicator Rules

The show indicator rules are used to modify the sub-graph (s) returned by the query. Show indicator rules can be applied to each meta-resource specified in the query. A show indicator rule can specify the following for a meta-resource:

ON; in which case resources matched against the meta-resource are shown in the result.

OFF; in which case resources matched against the meta-resource are not shown in the result.

Figure 19:
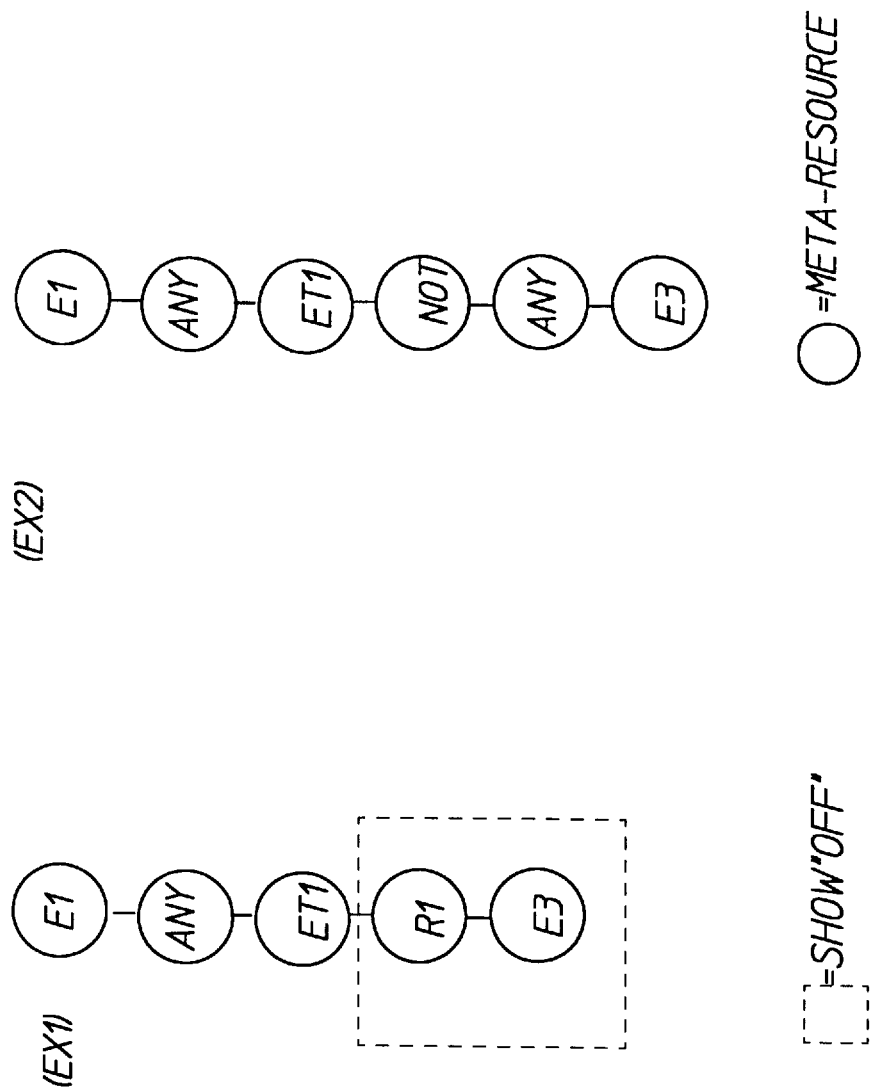
FIG. 19 depicts graphical representations of general topology queries relating to topological associations in the topological stored information base exemplifying the returned information generated by a show indicator.

If the result construction rule specifies the graph option, and a resource in the query result represents more than one meta-resource, the resource will be shown if there is at least one meta-resource, that matched the resource, and that specifies an 'on' show indicator. The default show indicator rule is 'ON'; Except for meta-resources modified by the logical NOT operator. These meta-resources are never displayed in the sub-graph result, as you cannot show something which is not supposed to be present. Examples of queries using show indicator rules are graphically depicted in FIG. 19 and may be described as follows:

Ex1: Show any result of resource E1 associated, via any resource, to any resource of type ET1, where the resource of type ET1 must be associated, via resource R1, to resource E3. Do not show R1 and E3.

Ex2: Show all results of resource E1 associated, via any resource, to any resource of type ET1, where the resource of type ET1 is not associated, via any resource, to resource E3. The result of query Ex1 will show any path from resource E1 to any resource of type ET1, provided that resource of type ET1 is associated to E3 via resource R1. The resources R1 and E3 are not included in the result as their show indicators are "off".

The result of query Ex2 will show all paths from resource E1 to any resource of type ET1, provided that resource of type ET1 is not associated, via any resource, to resource E3. If a logical NOT is specified, there is an implicit 'off' show indicator for all meta-resources following the logical NOT.

User Tags

The topology query service allows user tags to be specified on the meta-resources of the query. User tags are semantically irrelevant to the query evaluation process. The tags provide a means of identifying topology resources that matched a meta-resource in the query. Each sub-graph returned in the result of a query will copy all user tags from the meta-resources to their corresponding matched topology resource. If the result construction rule of the query specifies the 'graph' option, and a topology resource in the query result represents more than one meta-resource, the resource will copy all user tags from each meta-resource it matched.

Inputs

A request to query the topology graph structure, specifying:

A propositional expression on topology. The propositional expression consists of:
at least one meta-resource specifying matching criteria for topology resources and optionally specifying a filter.
at least one navigation path comprising one or more meta-resources
optional logical operators for combining and modifying navigation paths into compound propositions
optional repetition constructs
optional resource matching constraints A result construction rule Optional show indicator rules on meta-resources Optional user tags on meta-resources

Processing

The API evaluates the propositional expression of the query against the topology graph structure. The API returns true if the propositional expression is valid and returns false if the propositional expression is invalid. The API returns zero or more topology sub-graphs in accordance with the result construction rule supplied with the query and the show indicator rules specified for individual meta-resources.

Definition of a Valid Propositional Expression

The API considers the propositional expression of the query to be valid if:

The logical evaluation of the navigation paths which are rooted at the root of the query tree, as governed by the rules of logic, returns true.

The API considers a navigation path to be true if there exists a topology path that matches the navigation path. The API considers that a topology path matches a navigation path that does not contain a logical NOT connective, if all of the following are true:

all the resources in the topology path match the corresponding meta-resources in the navigation path (i.e. the first resource in the topology path matches the first meta-resource in the navigation path, and so on)

every resource in the topology path has an association, managed by the API service, with its immediately adjacent neighbors in the topology path all logical conditions expressed in the navigation path are satisfied The API considers that a topology path matches a navigation path that contains a logical NOT connective, if all of the following are true:

all the resources in the topology path match the corresponding meta-resources in the navigation path for that portion of the navigation query that proceeds the first NOT connective in the navigation path (i.e. the first resource in the topology path matches the first meta-resource in the navigation path, and so on)

every resource in the topology path has an association, managed by the API service, with its immediately adjacent neighbors in the topology path all logical conditions expressed in the navigation path are satisfied The API considers a resource to match a meta-resource if all of the following that apply to the meta-resource are true:

The meta-resource specifies a specific resource and the resource is the specific resource.

The meta-resource specifies 'any' resource.

The meta-resource specifies a resource aspect type and the resource is of the specified resource aspect type or a specialization of the specified resource aspect type.

The meta-resource specifies a proposition of resource aspect types and the resource aspect type of the resource evaluates the proposition to true.

The meta-resource specifies a resource role for the predecessor association and the association that was last traversed along the matching topology path was formed with the resource in the specified role.

The meta-resource specifies a resource role for the successor association and the association that will be next traversed along the matching topology path was formed with the resource in the specified role.

The meta-resource specifies a filter and the filter returns true when evaluated with the resource as an argument.

There is no resource matching constraints specified for the meta-resource and the resource does not match any other meta-resource.

There is an 'equals' constraint specified between the meta-resource and another meta-resource and the resource matched both meta-resources.

There is an 'don't care' constraint specified between the meta-resource (say A) and another meta-resource (say B) and the resource matched both A and B.

The meta-resource specifies a proposition of resource aspect attribute values and the resource aspect attribute values of the resource evaluates the proposition to be true.

The API considers that a logical condition in a query is satisfied if and only if:

logical AND: both child and navigation paths are matched.

logical OR: at least one child navigation path is matched.

logical NOT: no path in the API matches the child navigation path.

Definition of a Topology Sub-graph

The API considers as a topology sub-graph:

the topology paths that match the navigation paths which are rooted at the root of the query tree the associations between the resources in the topology paths, represented as two {resource aspect, resource role (including index)} tuples Definition of Sub-graph Output The API returns the resources and their associations that matched the query in the form of topology sub-graphs. The API outputs sub-graphs according to the following result construction rules:

None: The API does not include any sub-graphs in the result of the query.

Any: The API includes one sub-graph in the result of the query. The sub-graph is randomly chosen.

List: The API returns each sub-graph individually. The order of sub-graphs is randomly chosen.

Graph: The API combines all sub-graphs, removing duplicate resources, and return the resulting sub-graph.

The API supports show indicator rules for meta-resource of non-transposed navigation paths. The default value for a show indicator is 'ON'. The API modifies a topology sub-graph in accordance with show indicator rules as follows:

If a meta-resource specifies an 'ON' show indicator, the resource it matched in topology is shown in the sub-graph.

If a meta-resource specifies an 'OFF' show indicator, the resource it matched in topology is not shown in the sub-graph.

If the result construction rule for the query specifies the 'graph' option, and a resource in the sub-graph represents more than one meta-resource in the query, the resource is only shown in the sub-graph if there is at least one meta-resource that specifies an 'ON' show indicator.

The API supports user specified tags for each meta-resource in the query.

The API modifies a topology sub-graph in accordance with user tags as follows:

If a meta-resource specifies a user tag, the resource it matches in topology will be label with the user tag in the sub-graph.

If the result construction rule for the query specifies the 'graph' option, and a resource in the sub-graph represents more than one meta-resource in the query, the resource is labeled with all user tags associated with those resources.

Outputs

Boolean result of true or false. This part of the query result is always output.

Optional sub-graph(s). This part of the query result is dependent on the result construction rule, and show indicator rules.

There has been described methods and structure for a topology management service to manage topological association between objects. It should be understood that the particular embodiments shown in the drawings and described within this specification are for purposes of example and should not be construed to limit the invention which will be described in the claims below. Further, it is evident that those skilled in the art may now make numerous uses and modifications of the specific embodiments described, without departing from the inventive concepts. For example, the data constructs described herein could be implemented in a variety of well known software data structures. Specifically, representation of a resource by a resource name closure set could be implemented as linked list data structures, or as bit mapped fields indicative of set inclusion, or a myriad of other well known computer software data constructs. Furthermore, the methods described herein could be modified to manipulate a variety of data structures representing the topological stored information base. Or equivalent structures and processes may be substituted for the various structures and processes described. Consequently, the invention is to be construed as embracing each and every novel feature and novel combination of features present in, or possessed by, the methods and structure described.

What is claimed is:

1. A computer based method for managing topological associations among objects, comprising:

a) storing a number of objects in an information base, each of the number of objects possessing a number of resource names; and b) determining one or more resource name closure sets encompassing the number of objects stored in the information base, each of the one or more resource name closure sets comprising a largest subset of the number of objects stored in the information base such that each object of the largest subset shares a resource name with at least one other object of the largest subset, wherein the objects of each resource name closure set define a resource, and the resource names of said objects uniquely identify said resource.

2. A computer based method as in claim 1, further comprising:

a) receiving a request to manage a new object, the new object possessing a number of resource names; and b) determining whether the new object possesses one or more resource names which uniquely identify one or more known resources; and i) if not, defining a new resource by a resource name closure set comprising the new object, said new resource being uniquely identified by the number of resource names possessed by the new object;

ii) if so, and only one known resource is identified, adding the new object to the resource name closure set of the one known resource, said known resource now being uniquely identified by the number of resource names possessed by the new object and each of the objects in the resource name closure set of the identified known resource; and iii) if so, and more than one known resource is identified, A) defining a new resource by a resource name closure set comprising the new object and each of the objects in the resource name closure sets of the identified known resources, said new resource being uniquely identified by the number of resource names possessed by the new object and each of the objects in the resource name closure sets of the identified known resources; and B) deleting the resource name closure sets of the identified known resources.

3. A computer based method as in claim 1, further comprising:
   a) receiving a request to unmanage one of the number of objects stored in the information base; and
   b) determining whether the existing resource name closure set to which the object to be unmanaged belongs comprises additional objects; and
      i) if not, granting the request to unmanage, and deleting the existing resource name closure set;
      ii) if so, and each of the additional objects shares a resource name with at least one other of the additional objects, granting the request to unmanage; and
      iii) if so, and one or more of the additional objects does not share a resource name with at least one other of the additional objects,
         A) granting the request to unmanage;
         B) determining a plurality of new resource name closure sets encompassing the additional objects; and
         C) deleting the existing resource name closure set.

4. A computer based method as in claim 1, further comprising:
   a) receiving a request to add a resource name to a given one of the number of objects stored in the information base;
   b) adding the resource name to the given object; and
   c) determining whether the added resource name identifies one or more resources in addition to a first resource defined by the resource name closure set to which the given object belongs, and if so,
      i) defining a new resource by a resource name closure set comprising each of the objects in the resource name closure sets of each of the first and additional one or more resource name closure sets; and
      ii) deleting the resource name closure sets of each of the first and additional one or more resource name closure sets.

5. A computer based method as in claim 1, further comprising:
   a) receiving a request to remove a resource name from a given one of the number of objects stored in the information base;
   b) removing the resource name from the given object;
   c) determining one or more new resource name closure sets encompassing the number of objects in the existing resource name closure set to which the given object belongs; and
   d) deleting the existing resource name closure set.

6. A computer based method as in claim 1, further comprising:
   a) receiving a request to explicitly combine at least two resources;
   b) generating a unique resource name;
   c) adding the unique resource name to an object in the resource name closure sets of each of the at least two resources;
   d) defining a new resource by a resource name closure set comprising each of the objects in the resource name closure sets of the at least two resources, said new resource being uniquely identified by the number of resource names possessed by each of the objects in the resource name closure sets of the at least two resources; and
   e) deleting the resource name closure sets of the at least two resources.

7. A computer based method as in claim 1, further comprising storing a number of resource aspect types in a resource aspect type store, wherein:
   a) a resource aspect type comprises a number of rules defining permitted associations for object instances of the resource aspect type; and
   b) each of the number of objects stored in the information base is an instance of one of the resource aspect types.

8. A computer based method as in claim 7, wherein the number of resource aspect types are hierarchical in nature, and a given resource aspect type which is a specialization of at least one other resource aspect type inherits the number of rules of the at least one other resource aspect type, in addition to the number of rules of the given resource aspect type.

9. A computer based method as in claim 8, further comprising:
   a) configuring a number of enforcer objects, each of which comprises at least one trigger condition associated with at least one constraint, and each of which is related to a resource aspect type; and
   b) when a request to change the information base is received, and the request meets a trigger condition of any enforcer object, ensuring that the change to the information base complies with the constraints of the met trigger conditions;
   wherein the trigger conditions of an enforcer object related to a given resource aspect type are inherited by resource aspect types which are specializations of the given resource aspect type.

10. A computer based method as in claim 8, further comprising:
    a) configuring a number of notification receiver objects, each of which comprises at least one trigger condition, and each of which is related to a resource aspect type; and
    b) when a request to change the information base is received, and the request meets a trigger condition of any notification receiver object, logging the change to the information base with the notification receiver object comprising the met trigger condition;
    wherein the trigger conditions of a notification receiver object related to a given resource aspect type are inherited by resource aspect types which are specializations of the given resource aspect type.

11. A computer based method as in claim 8, further comprising:
    a) configuring a number of notification receiver objects, each of which comprises at least one trigger condition, and each of which is related to an object stored in the information base; and
    b) when a request to change the information base is received, and the request meets a trigger condition of any notification receiver object, logging the change to the information base with the notification receiver object comprising the met trigger condition;
    wherein the trigger conditions of a notification receiver object related to a given resource aspect type are inherited by resource aspect types which are specializations of the given resource aspect type.

12. A computer based method as in claim 7, wherein the number of rules for a given resource aspect type comprise a number of configurable rules, each configurable rule comprising:
    a) a role;
    b) a minimum and a maximum number of associations in which an object instance of the given resource aspect type must participate; and
    c) a resource aspect type indicating a type of object with which an association pursuant to the configurable rule must be performed.

13. A computer based method as in claim 7, further comprising:
   a) configuring a number of enforcer objects, each of which is related to a resource aspect type; and
   b) when a request to change the information base is received, and the request meets a trigger condition of any enforcer object, ensuring that the change to the information base complies with the constraints of the met trigger conditions.

14. A computer based method as in claim 7, further comprising:
   a) configuring a number of notification receiver objects, each of which comprises at least one trigger condition, and each of which is related to a resource aspect type; and
   b) when a request to change the information base is received, and the request meets a trigger condition of any notification receiver object, logging the change to the information base with the notification receiver object comprising the met trigger condition.

15. A computer based method as in claim 7, further comprising:
   a) configuring a number of notification receiver objects, each of which comprises at least one trigger condition, and each of which is related to an object stored in the information base; and
   b) when a request to change the information base is received, and the request meets a trigger condition of any notification receiver object, logging the change to the information base with the notification receiver object comprising the met trigger condition.

16. A computer based method as in claim 7, wherein:
   a) the number of rules for a given resource aspect type comprise rules comprising:
      i) a role;
      ii) a minimum and a maximum number of associations in which an object instance of the given resource aspect type must participate; and
      iii) a resource aspect type indicating a type of object with which an association pursuant to the configurable rule must be performed; and
   b) the resource aspect types and rules comprise those in the following

| Resource Aspect Type | Rules | | | |
|---|---|---|---|---|
| | Role | Min. | Max. | Associated Resource Aspect Type |
| logical_network | network | 0 | 1 | logical_network_containment |
| | network | 0 | 1 | logical_segment_containment |
| logical_network_containment | container | 0 | 1 | logical_network |
| | container | 0 | N | logical_segment |
| logical_segment_containment | container | 0 | 1 | logical_segment |
| | container | 0 | N | logical_network |
| logical_node | logical_device | 0 | 1 | logical_node_containment |
| logical_node_containment | container | 0 | 1 | logical_node |
| | container | 0 | N | logical_if |
| logical_if | interface | 0 | 1 | logical_node_containment |
| | interface | 0 | 1 | logical_interface_connection |
| logical_interface_connection | connector | 0 | 1 | logical_if |
| | connector | 0 | 1 | logical_segment |
| logical_segment | segment | 0 | N | logical_interface_connection |
| | segment | 0 | 1 | logical_boundary |
| | segment | 0 | 1 | logical_network_containment |
| | segment | 0 | 1 | logical_segment_containment |
| logical_boundary | bounds | 0 | N | logical_segment |
| | bounds | 0 | N | logical_connector (inherited) |
| logical_connector | connection device | 0 | 1 | logical_boundary |

17. A computer based method as in claim 16, wherein the resource aspect type logical_segment further comprises the rule in the following table:

| Resource Aspect Type | Rules | | | |
|---|---|---|---|---|
| | Role | Min. | Max. | Associated Resource Aspect Type |
| logical_segment | segment | 0 | 1 | physical_network |

18. A computer based method as in claim 17, wherein the resource aspect types and rules further comprise those in the following table:

|  | | Rules | | |
| --- | --- | --- | --- | --- |
| Resource Aspect Type | Role | Min. | Max. | Associated Resource Aspect Type |
| physical_network | phy_network | 0 | 1 | logical_segment |
|  | phy_network | 0 | 1 | physical_segment_containment |
| physical_segment_containment | container | 0 | 1 | physical_network |
|  | container | 0 | N | physical_segment |
| physical_node | chasis | 0 | 1 | physical_node_containment |
| physical_node_containment | container | 0 | N | physical_if |
|  | container | 0 | 1 | physical_node |
| physical_if | interface | 0 | 1 | physical_node_containment |
|  | interface | 0 | 1 | physical_interface_connection |
| physical_interface_connection | connector | 0 | 1 | physical_if |
|  | connector | 0 | 1 | physical_segment |
| physical_segment | segment | 0 | N | physical_interface_connection |
|  | segment | 0 | 1 | physical_boundary |
|  | segment | 0 | 1 | physical_segment_containment |
| physical_boundary | bounds | 0 | N | physical_segment |
|  | bounds | 0 | N | physical_connector (inherited) |
| physical_connector | bounds | 0 | 1 | physical_boundary |

19. A computer based method as in claim 18, wherein the resource aspect type logical_segment further comprises the rule in the following table:

|  | | Rules | | |
| --- | --- | --- | --- | --- |
| Resource Aspect Type | Role | Min. | Max. | Associated Resource Aspect Type |
| physical_segment | segment | 0 | 1 | media_containment |

20. A computer based method as in claim 19, wherein the resource aspect types and rules further comprise those in thefollowing table:

|  | | Rules | | |
| --- | --- | --- | --- | --- |
| Resource Aspect Type | Role | Min. | Max. | Associated Resource Aspect Type |
| media_containment | attachment | 0 | 1 | physical_segment |
|  | container | 0 | 1 | media_network |
| media_network | media_network | 0 | 1 | media_containment |
|  | media_container | 0 | N | media_cable |
| media_terminator | termination | 0 | 1 | media_cable |
| media_cable | physical_wire | 0 | 1 | media_terminator |
|  | physical_wire | 0 | 1 | media_fitting |
|  | physical_wire | 0 | 2 | media_connector |
|  | physical_wire | 0 | 1 | media_network |
| media_fitting | cable_ink | 0 | 1 | media_cable |
| media_connector | connector | 0 | 1 | media_cable |

21. A system for managing topological associations among a number of objects stored in an information base, each of the number of objects possessing a number of resource names, comprising:

a) a resource aspect type store comprising resource aspect types, each resource aspect type comprising a number of rules defining permitted associations for object instances of the resource aspect type, wherein each of the number of objects stored in the information base is an instance of one of the resource aspect types; and b) computer code for determining one or more resource name closure sets encompassing the number of objects stored in the information base, each of the one or more resource name closure sets comprising a largest subset of the number of objects stored in the information base such that each object of the largest subset shares a resource name with at least one other object of the largest subset, wherein the objects of each resource name closure set define a resource, and the resource names of said objects uniquely identify said resource.

* * * * *

UNITED STATES PATENT AND TRADEMARK OFFICE
CERTIFICATE OF CORRECTION

PATENT NO. : 5,878,431 Page 1 of 1
DATED : March 2, 1999
INVENTOR(S) : Robert A. Potterveld et al.

It is certified that error appears in the above-identified patent and that said Letters Patent is hereby corrected as shown below:

Column 10,
Line 39, delete "RULES ROLES" and insert therefor -- RULES, ROLES --;

Column 17,
Line 48, delete "logicaIL" and insert therefor -- logical --;

Drawings,
Fig. 1, in the "MAIN MEMORY" box, delete "MANAGMENT" and insert therefor -- MANAGEMENT --;
Fig. 2, top margin, right hand side box, delete "RESOURCE-ASPECT TYPE RULES" and insert therefor -- NOTIFICATION RECEIVER 226 --;
Fig. 9, the question "DO REMAINING OBJECTS STILL SHARE COMMON RESOURCE IDENTIFIERS?" delete "IDENTIFIERS" and insert therefor -- NAMES --; and
In box 910, delete "ELIMINATE RESOURCE IDENTIFIERS FROM IDENTIFIER RESOURCE UNIQUE TO IDENTIFIED RESOURCE" and insert therefor -- ELIMINATE RESOURCE NAMES FROM IDENTIFIED RESOURCE WHICH ARE UNIQUE TO REMOVED OBJECT --;
Fig. 10, in each of the bottom two boxes, delete "LIND_NETWORK" and insert therefor -- LINK_NETWORK --;
Fig. 11, in the box 1128, delete "IP_ROUTER" and insert therefor -- LINK_BRIDGE --; and
In the box 1142, delete "IP_ROUTER" and insert therefor -- IOBASET_HUB --.

Signed and Sealed this

Ninth Day of July, 2002

*Attest:*

JAMES E. ROGAN
*Attesting Officer*     *Director of the United States Patent and Trademark Office*